(12) United States Patent
DeVincentis et al.

(10) Patent No.: US 8,294,382 B2
(45) Date of Patent: *Oct. 23, 2012

(54) LOW FREQUENCY ELECTRODELESS PLASMA LAMP

(75) Inventors: Marc DeVincentis, Palo Alto, CA (US); Dan O'Hare, Livermore, CA (US)

(73) Assignee: Luxim Corporation, Sunnyvale, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 12/683,261

(22) Filed: Jan. 6, 2010

(65) Prior Publication Data

US 2010/0171436 A1    Jul. 8, 2010

Related U.S. Application Data

(60) Provisional application No. 61/238,467, filed on Aug. 31, 2009, provisional application No. 61/142,844, filed on Jan. 6, 2009.

(51) Int. Cl.
H05B 41/24    (2006.01)

(52) U.S. Cl. .......... 315/248; 315/39; 315/111.21; 313/231.31

(58) Field of Classification Search .......... 315/39, 315/111.21, 248; 313/231.31, 231.36
See application file for complete search history.

(56) References Cited

U.S. PATENT DOCUMENTS

| | | | |
|---|---|---|---|
| 3,787,705 A | 1/1974 | Bolin et al. | |
| 3,826,950 A | 7/1974 | Hruda et al. | |
| 4,001,631 A | 1/1977 | McNeill et al. | |
| 4,206,387 A | 6/1980 | Kramer et al. | |
| 4,485,332 A | 11/1984 | Ury et al. | |
| 4,498,029 A | 2/1985 | Yoshizawa et al. | |
| 4,633,140 A | 12/1986 | Lynch et al. | |
| 4,749,915 A | 6/1988 | Lynch et al. | |
| 4,795,658 A | 1/1989 | Kano et al. | |
| 4,887,192 A | 12/1989 | Simpson et al. | |
| 4,950,059 A | 8/1990 | Roberts | |
| 4,975,625 A | 12/1990 | Lynch et al. | |
| 4,978,891 A | 12/1990 | Ury | |

(Continued)

FOREIGN PATENT DOCUMENTS

CN    102356449 A    2/2012

(Continued)

OTHER PUBLICATIONS

"Chinese Application Serial No. 201080010589.3, Office Action mailed Sep. 19, 2011", 1 pg.

(Continued)

*Primary Examiner* — Douglas W Owens
*Assistant Examiner* — Thai Pham
(74) *Attorney, Agent, or Firm* — Schwegman Lundberg & Woessner, P.A.

(57) ABSTRACT

In various exemplary embodiments, an electrodeless plasma lamp includes a bulb configured to be coupled to a source of radio frequency (RF) power. The bulb contains a fill that forms a plasma when the RF power is coupled to the fill. An electrically-conductive convex shield is positioned proximate to the bulb with a convex surface of the shield being distal to the bulb. A resonant structure having a quarter wave resonant mode includes a lamp body having a dielectric material having a relative permittivity greater than 2 with an inner conductor and an outer conductor. The source of RF power is configured to provide RF power to the lamp body at about a resonant frequency for the resonant structure.

12 Claims, 15 Drawing Sheets

U.S. PATENT DOCUMENTS

| | | | |
|---|---|---|---|
| 5,039,903 | A | 8/1991 | Farrall |
| 5,070,277 | A | 12/1991 | Lapatovich |
| 5,072,157 | A | 12/1991 | Greb et al. |
| 5,086,258 | A | 2/1992 | Mucklejohn et al. |
| 5,113,121 | A | 5/1992 | Lapatovich et al. |
| 5,361,274 | A | 11/1994 | Simpson et al. |
| 5,438,242 | A | 8/1995 | Simpson |
| 5,448,135 | A | 9/1995 | Simpson |
| 5,498,937 | A | 3/1996 | Korber et al. |
| 5,525,865 | A | 6/1996 | Simpson |
| 5,594,303 | A | 1/1997 | Simpson et al. |
| 5,786,667 | A | 7/1998 | Simpson et al. |
| 5,910,710 | A | 6/1999 | Simpson |
| 5,910,754 | A | 6/1999 | Simpson et al. |
| 5,923,116 | A | 7/1999 | Mercer et al. |
| 5,977,724 | A * | 11/1999 | Dolan et al. ............... 315/248 |
| 6,020,800 | A | 2/2000 | Arakawa et al. |
| 6,031,333 | A | 2/2000 | Simpson |
| 6,049,170 | A | 4/2000 | Hochi et al. |
| 6,137,237 | A | 10/2000 | MacLennan et al. |
| 6,246,160 | B1 | 6/2001 | MacLennan et al. |
| 6,252,346 | B1 | 6/2001 | Turner et al. |
| 6,265,813 | B1 * | 7/2001 | Knox et al. ............... 313/113 |
| 6,313,587 | B1 | 11/2001 | MacLennan et al. |
| 6,424,099 | B1 | 7/2002 | Kirkpatrick et al. |
| 6,566,817 | B2 | 5/2003 | Lapatovich |
| 6,617,806 | B2 | 9/2003 | Kirkpatrick et al. |
| 6,666,739 | B2 | 12/2003 | Pothoven et al. |
| 6,737,809 | B2 | 5/2004 | Espiau et al. |
| 6,856,092 | B2 | 2/2005 | Pothoven et al. |
| 6,922,021 | B2 | 7/2005 | Espiau et al. |
| 6,956,329 | B2 | 10/2005 | Brooks et al. |
| 7,034,464 | B1 | 4/2006 | Izadian et al. |
| 7,291,985 | B2 | 11/2007 | Espiau et al. |
| 7,348,732 | B2 | 3/2008 | Espiau et al. |
| 7,358,678 | B2 | 4/2008 | Espiau et al. |
| 7,362,054 | B2 | 4/2008 | Espiau et al. |
| 7,362,055 | B2 | 4/2008 | Espiau et al. |
| 7,362,056 | B2 | 4/2008 | Espiau et al. |
| 7,372,209 | B2 | 5/2008 | Espiau et al. |
| 7,391,158 | B2 | 6/2008 | Espiau et al. |
| 7,429,818 | B2 | 9/2008 | Chang et al. |
| 2001/0035720 | A1 | 11/2001 | Guthrie et al. |
| 2004/0108815 | A1 | 6/2004 | Ukegawa et al. |
| 2005/0212456 | A1 | 9/2005 | Espiau et al. |
| 2005/0286263 | A1 | 12/2005 | Champion et al. |
| 2006/0250090 | A9 | 11/2006 | Guthrie et al. |
| 2007/0109069 | A1 | 5/2007 | Espiau et al. |
| 2007/0217732 | A1 | 9/2007 | Chang et al. |
| 2007/0241688 | A1 * | 10/2007 | DeVincentis et al. ... 315/111.21 |
| 2008/0054813 | A1 * | 3/2008 | Espiau et al. ............ 315/111.21 |
| 2008/0078249 | A1 * | 4/2008 | May ............................... 73/643 |
| 2008/0211971 | A1 | 9/2008 | Pradhan |
| 2008/0258627 | A1 | 10/2008 | DeVincentis |
| 2010/0156301 | A1 * | 6/2010 | Hollingsworth et al. ..... 315/149 |
| 2010/0156310 | A1 * | 6/2010 | Hollingsworth et al. ..... 315/248 |
| 2012/0086352 | A1 * | 4/2012 | Espiau et al. ................. 315/248 |

FOREIGN PATENT DOCUMENTS

| | | | |
|---|---|---|---|
| EP | 2386110 | A1 | 11/2011 |
| JP | 8148127 | | 6/1996 |
| JP | 2001266803 | A | 9/2001 |
| JP | 2003249197 | A | 9/2003 |
| KR | 1020050018587 | A | 2/2005 |
| WO | WO-2006070190 | A1 | 7/2006 |
| WO | WO-2006129102 | A2 | 12/2006 |
| WO | WO-2007138276 | A2 | 12/2007 |
| WO | WO-2010020251 | A1 | 7/2010 |
| WO | WO-2010080828 | A1 | 7/2010 |

OTHER PUBLICATIONS

"International Application Serial No. PCT/US2010/020251, International Preliminary Report on Patentability mailed Jul. 21, 2011", 10 pgs.

"Chapter 4—Cavity Resonators, Army Technical Manual, TM 11-673—Generation and Transmission of Microwave Energy", (Jun. 1953), 12 pgs.

"Chapter 6.3—Rectangular Waveguide Cavities", in: Microwave Engineering, Pozar, D. M., Editor (John Wiley & Sons, Inc.), (Jul. 1997), pp. 313-318.

"International Application Serial No. PCT/US2010/020251 Invitation to Pay Add'l Fees and Partial Search Report mailed Mar. 18, 2010", 3 pgs.

"International Application Serial No. PCT/US2010/020251, Search Report mailed May 17, 2010", 5 pgs.

"International Application Serial No. PCT/US2010/020251, Written Opinion mailed May 17, 2010", 8 pgs.

Espiau, F. M., et al., "PLASMA LAMP", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating A Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp Is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson, 16 pgs.

Guthrie, Charles, "LAMP", U.S. Appl. No. 60/687,458, filed Jun. 6, 2005, 12 pgs.

Guthrie, Charles, et al., "LAMP", U.S. Appl. No. 60/687,280, filed Jun. 3, 2005, and Neate, 17 pgs.

Inventors Not Listed, "LAMP", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating A Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating A Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into A Waveguide", U.S. Appl. No. 60/262,536, filed Jan. 17, 2001, 6 pgs.

Sandberg, E., "An Improved Drive Circuit for an Electrode-Less Plasma Lamp That Is Embedded in A Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D, et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique For Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That Is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

* cited by examiner

LOW FREQUENCY ELECTRODELESS PLASMA LAMP

RELATED APPLICATIONS

This application claims priority benefit to U.S. Provisional Patent Applications having Ser. Nos. of 61/142,844 and 61/238,467, each entitled, "LOW FREQUENCY ELECTRODELESS PLASMA LAMP," filed Jan. 6, 2009 and Aug. 31, 2009, respectively, both of which are hereby incorporated by reference in their entirety.

FIELD

The field relates to systems and methods for generating light, and more particularly, to electrodeless plasma lamps.

BACKGROUND

Electrodeless plasma lamps provide point-like, bright, white light sources. Since plasma lamps of this type do not use electrodes, electrodeless plasma lamps often have longer useful lifetimes than other lamps. In an electrodeless plasma lamp, radio frequency power may be coupled into a fill in a bulb to create a light-emitting plasma.

SUMMARY

Figure 1A:
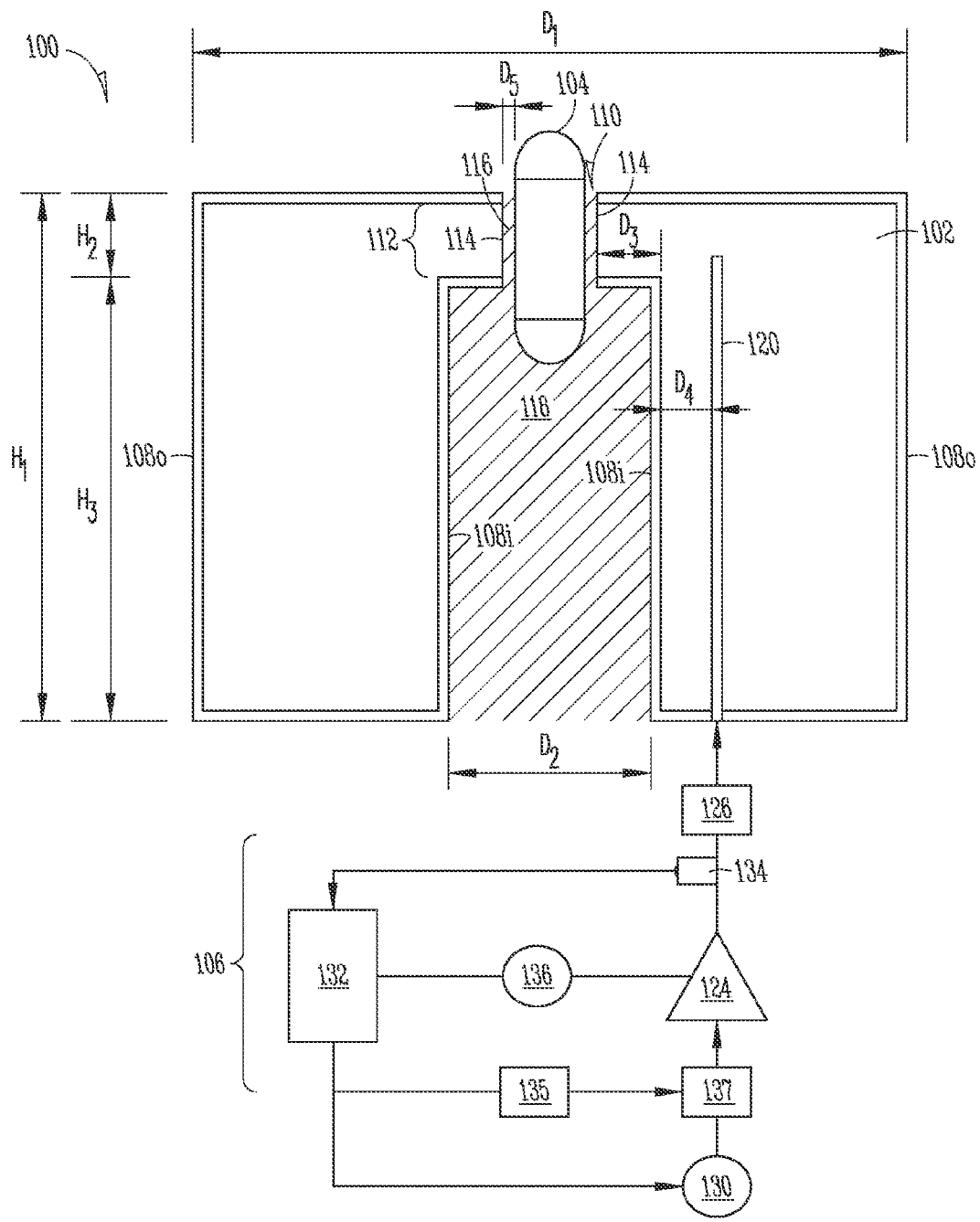
FIG. 1A is a cross-section and schematic view of a plasma lamp according to an example embodiment.

In an example embodiment, an electrodeless plasma lamp is disclosed. The electrodeless plasma lamp includes a resonant structure having a quarter wave resonant mode. The resonant structure has an inner conductor, an outer conductor, and a solid dielectric material between the inner conductor and the outer conductor. The electrodeless plasma lamp further includes a source of radio frequency (RF) power to provide RF power to the resonant structure at about the resonant frequency for the quarter wave resonant mode. A bulb contains a fill to form a plasma when the RF power is coupled to the fill. The bulb is positioned proximate to a non-conductive surface of the solid dielectric material. An electrically-conductive convex shield is positioned proximate to the bulb with a convex surface of the shield being distal to the bulb.

In another example embodiment, an electrodeless plasma lamp is disclosed. The electrodeless plasma lamp includes a resonant structure of a solid dielectric material having a relative permittivity greater than 2 and at least one conductive material proximate the solid dielectric material. A source of radio frequency (RF) power provides RF power to the resonant structure at a frequency having a wavelength in free space at the relative permittivity of the dielectric material ($\lambda$). A bulb contains a fill that forms a plasma when the RF power is coupled to the fill. An electrically-conductive convex shield is positioned proximate to the bulb. The shield having a convex surface of the shield being distal to the bulb. Each of the dimensions across the resonant structure (including height and width) are less than $\lambda/2$. The RF power is provided at about a resonant frequency for the resonant structure.

In another example embodiment, an electrodeless plasma lamp is disclosed. The electrodeless plasma lamp includes a bulb to be coupled to a source of radio frequency (RF) power. The bulb contains a fill to form a plasma when the RF power is coupled to the fill. An electrically-conductive convex shield is positioned proximate to the bulb with a convex surface of the shield being distal to the bulb. The electrodeless plasma lamp further includes a resonant structure having a quarter wave resonant mode. The resonant structure has a lamp body of a dielectric material having a relative permittivity greater than 2 and an inner conductor and outer conductor. The source of RF power is to provide RF power to the lamp body at about a resonant frequency for the resonant structure.

DESCRIPTION

While example embodiments of the present invention are open to various modifications and alternative constructions, the embodiments shown in the drawings will be described herein in detail. It is to be understood, however, there is no intention to limit the inventive subject matter to the particular forms disclosed. On the contrary, it is intended that the inventive subject matter cover all modifications, equivalences, and alternative constructions falling within the spirit and scope of the invention as expressed in the appended claims.

FIG. 1A is a cross-section and schematic view of a plasma lamp 100 according to an example embodiment. This is an example only and other plasma lamps may be used with other embodiments, including microwave or inductive plasma lamps. In the example of FIG. 1A, the plasma lamp 100 may have a lamp body 102 formed from one or more solid dielectric materials and a bulb 104 positioned adjacent to the lamp body 102. In one example embodiment, the lamp body 102 is formed from solid alumina having a relative permittivity of about 9.2. The bulb contains a fill that is capable of forming a light emitting plasma. A lamp drive circuit 106 couples radio frequency power into the lamp body 102 which, in turn, is coupled into a fill (not shown explicitly) in the bulb 104 to form the light emitting plasma. In example embodiments, the lamp body 102 forms a resonant structure that contains the radio frequency power and provides it to the fill in the bulb 104.

In example embodiments, the lamp body 102 is relatively tall and is coated with an electrically conductive material. A recess 118 is formed inside the lamp body 102. An outer coating 108o on the outside of the lamp body 102 forms an outer conductor. An inner coating 108i inside the recess 118 forms an inner conductor. The outer conductor and the inner conductor are grounded together by the conductive coating across the bottom of the lamp body 102. The outer conductor continues on top of the lamp body 102 and surrounds the bulb 104 near the top of the bulb 104 (although a portion of the bulb 104 extends beyond the outer conductor). The inner conductor also extends toward the bulb 104 and surrounds the bulb 104 near the bottom (although a portion of the bulb 104 extends beyond the inner conductor into the recess 118). An uncoated surface 114 (or surfaces) of the lamp body 102 is not coated with a conductive material (the outer conductor and the inner conductor form an open circuit proximate the bulb 104). When a length of the inner conductor H3 is about one quarter of a wavelength of the radio frequency power in this waveguide structure ($\lambda_g$), this structure approximates a quarter wave coaxial resonator. The short circuit end of the quarter wave resonator is found along the bottom of the lamp body 102 where the outer coating 108o and the inner coating 108i are grounded together by a conductive coating. The open circuit end of the quarter wave resonator is at the uncoated surface 114. This is in contrast to a wider and shorter configuration, which approximates a half wavelength resonant cavity rather than a quarter wave coaxial resonator.

In the example embodiment of FIG. 1A, an opening 110 extends through a thin region 112 of the lamp body 102. The uncoated surface 114 of the lamp body 102 in the opening 110 is uncoated and at least a portion of the bulb 104 may be positioned in the opening 110 to receive power from the lamp body 102. In example embodiments, a thickness H2 of the thin region 112 may range from 1 mm to 15 mm or any range subsumed therein and may be less than the outside length and/or interior length of the bulb 104. One or both ends of the bulb 104 may protrude from the opening 110 and extend beyond the electrically conductive coating on the outer surface of the lamp body 102. This helps avoid damage to the ends of the bulb 104 (or bulbs, not shown) from the high intensity plasma formed adjacent to the region where power is coupled from the lamp body 102.

The inner and outer conductors provide a capacitive region of high electric field intensity in the thin region 112 of the lamp body 102 proximate the bulb 104. This creates an electric field in the bulb 104 that is substantially aligned along the central axis of the bulb 104, substantially parallel to the cylindrical walls of the bulb 104. However, since the ends of the bulb 104 extend beyond the inner and outer conductors, the electric field and plasma is confined primarily in the middle region of the bulb 104 rather than impacting the ends of the bulb 104 (which may potentially damage the bulb). The thin region 112 of dielectric material bounded by shapes of the inner and outer conductor and controls the electric field applied to the bulb 104.

In some embodiments, a height H1 is less than $\lambda_g/4$ due to the capacitance provided by the thin region 112. The frequency required to excite a particular resonant mode in the lamp body 102 also generally scales inversely to the square root of the relative permittivity (also referred to as the dielectric constant) of the lamp body 102. As a result, a higher relative permittivity results in a smaller lamp body required for a particular resonant mode at a given frequency of power (or a lower frequency for a lamp body of a given size). Also, the lamp body 102 can have dimensions less than one half the wavelength of the RF power in the waveguide (less than $\lambda_g/2$) in contrast to a resonant cavity lamp. In example embodiments, both the height and diameter (or width) of the lamp is less than $\lambda_g/2$ for the resonant structure. In example embodiments, both the height H1 and diameter D1 (or width for rectangular and other shapes) of the lamp may be less than $\lambda/2$ in free space for the relative permittivity of the dielectric material used for the lamp body 102. In some embodiments, the inner conductor and outer conductor may not be parallel and may slope relative to one another or have an irregular shape. In other embodiments, the outer conductor and/or the inner conductor may be rectangular or other shape.

High frequency simulation software may be used to help select the materials and shape of the lamp body 102 and electrically conductive coating to achieve desired resonant frequencies and field intensity distribution in the lamp body 102. The desired properties may then be fine-tuned empirically.

The plasma lamp 100 has a drive probe 120 inserted into the lamp body 102 to provide radio frequency power to the lamp body 102. A lamp drive circuit 106 including a power supply, such as an amplifier 124, may be coupled to the drive probe 120 to provide the radio frequency power. The amplifier 124 may be coupled to the drive probe 120 through a matching network, such as a low pass filter 126, to provide impedance matching. In an example embodiment, the lamp drive circuit 106 is matched to the load (formed by the lamp body 102, bulb 104, and plasma) for the steady-state operating conditions of the lamp. The lamp drive circuit 106 is matched to the load at the drive probe 120 using the low pass filter 126.

In example embodiments, the radio frequency power may be provided at or near a frequency that resonates within the resonant structure formed by the lamp body 102 and inner and outer conductors. In example embodiments, radio frequency power may be provided at a frequency in the range of between about 50 MHz and about 10 GHz or any range subsumed therein. The radio frequency power may be provided to the drive probe 120 at or near a resonant frequency for the lamp body 102. The frequency may be selected based on the dimensions, shape, and relative permittivity of the lamp body 102 and length of the inner and outer conductors to provide resonance. In example embodiments, the frequency is selected for a quarter wave resonant mode for the resonant structure. In example embodiments, the RF power may be applied at a resonant frequency or in a range of from 0% to 10% above or below the resonant frequency or any range subsumed therein. In some embodiments, RF power may be applied in a range of from 0% to 5% above or below the resonant frequency. In some embodiments, power may be provided at one or more frequencies within the range of about 0 to 50 MHz above or below the resonant frequency or any range subsumed therein. In another example, the power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In example embodiments, the radio frequency power causes a light emitting plasma discharge in the bulb 104. In example embodiments, power is provided by RF wave coupling. In example embodiments, RF power is coupled at a frequency that forms approximately a standing quarter waveform in the lamp body 102 for the particular resonant structure.

Figure 1B:
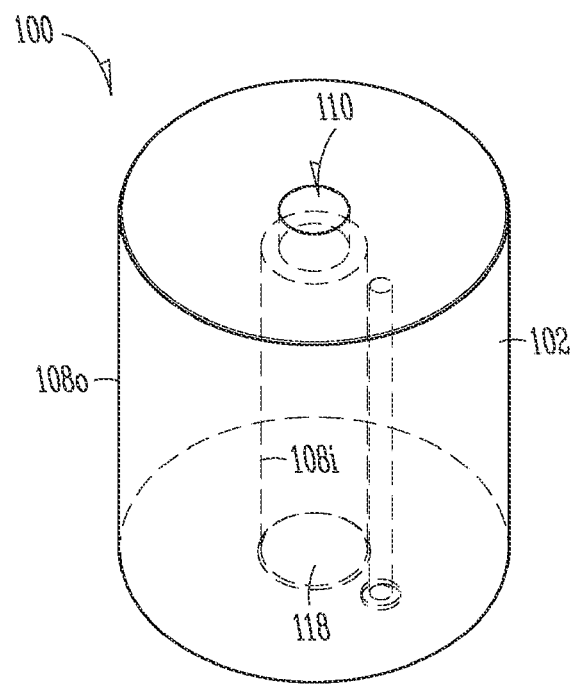
FIG. 1B is a perspective cross-section view of a lamp body with a cylindrical outer surface according to an example embodiment.
Figure 1C:
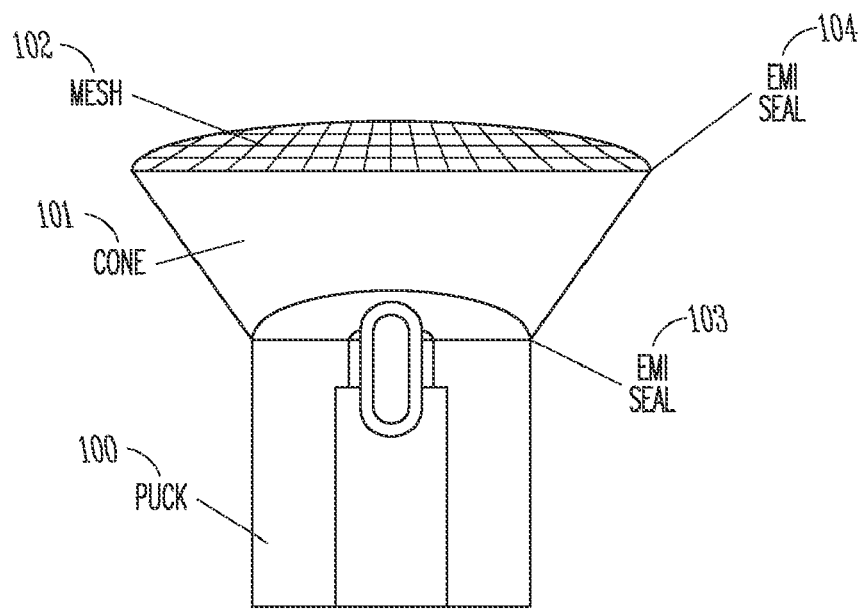
FIG. 1C is a perspective cross-section view of a lamp body with an integrated electromagnetic shield according to an example embodiment.

In the example embodiment of FIG. 1C showing a perspective cross-section view of a lamp body with an integrated electromagnetic shield, a plasma lamp is integrated with an electromagnetic shield to reduce or eliminate radiated electromagnetic interference (EMI). The shield includes a cone 101 and a mesh 102, although other embodiments may exclusively use either the cone 101 or the mesh 102. The lamp derives a certain amount of shielding from each, and in certain embodiments it may not require both components.

In many applications, a high degree of shielding will come from the mesh 102, which is a matrix of conducting wires. Since the mesh 102 obstructs the light path, it is designed with consideration for the amount of shielding required. A dense mesh with small wire-to-wire spacing will provide more shielding at the expense of attenuating the amount of light that can transmit through the mesh 102. A sparse mesh with large wire-to-wire spacing will transmit more light, but will not provide as much shielding. The wires may be arranged on a rectangular, hexagonal, or radial grid, or any other geometrical or non-geometrical pattern with uniform or non-uniform spacing. By using either a radial mesh or a non-uniformly spaced mesh, the mesh density and therefore the shielding may be increased only in areas with relatively stronger electric fields while not obstructing the light path unnecessarily in areas with relatively weak electric fields.

The cone 101 typically serves a dual purpose as a light reflector and an EMI shield. The cone 101 is, for example, a metal enclosure for the electric and magnetic fields that has an exit diameter significantly less than one wavelength. The aspect ratio of the cone 101 controls the shielding effectiveness, and, in an example embodiment, an aspect ratio of 3:1 (exit aperture diameter to height) is typically sufficient to achieve regulatory compliance without the mesh 102 for a less than a 400 W lamp. Many practical reflector designs may require smaller aspect ratios, closer to 1:1, which is why a mesh is often used to provide additional shielding. In this embodiment, the cone 101 is truly a geometrical cone, although in other embodiments it might have a cylindrical, flared cone, parabolic, elliptical, or any other shape as required by the reflector optical design. The lamp, the mesh 102, and the cone 101 can be sealed at any interface between components by a conductive EMI seal 103, 104 or gasket. The conductive EMI seal 103, 104 may typically either be made of small metal springs, or else from a spongy metal-filled elastomer such as nickel-graphite-filled silicone rubber. One purpose of the conductive EMI seal 103, 104 is to provide low contact resistance between adjacent components, and further to mitigate long term degradation, such as by galvanic corrosion of metal surfaces.

In example embodiments, the mesh 102 may be integrated with a glass window to provide structural support for the mesh 102. In such embodiments, the mesh 102 may be molded into the glass, or by other means located inside of the glass. In some such embodiments, the mesh 102 may be laminated, printed, or otherwise deposited on one or both faces of the glass. In some embodiments, the mesh 102 may be mechanically held against the glass by means of an external clamp or chemically affixed by means of, for example, an adhesive.

Figure 1D:
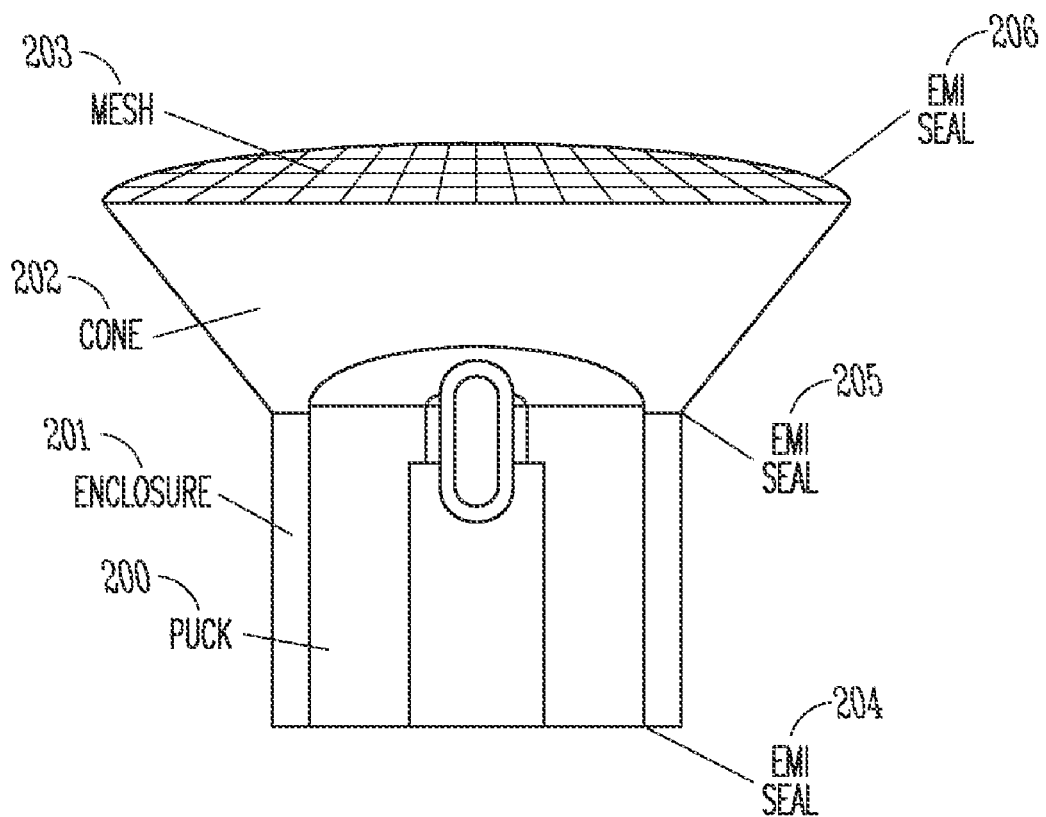
FIG. 1D is a perspective cross-section view of a lamp body in an enclosure with an integrated electromagnetic shield according to an example embodiment.

In the example embodiment of FIG. 1D showing a perspective cross-section view of a lamp body in an enclosure with an integrated electromagnetic shield, a lamp is enclosed in an electrically conductive enclosure 201 or housing. A cone 202 and a mesh 203 serve the same or similar functions, but an EMI seal 204, 205, 206 is located differently than the embodiment shown in FIG. 1C. The EMI seal 205 is formed between the electrically conductive enclosure 201 and the cone 202, while the EMI seal 204 is made between the electrically conductive enclosure 201 and a puck. A further EMI seal 206 is provided at the mesh 203.

Figure 1E:
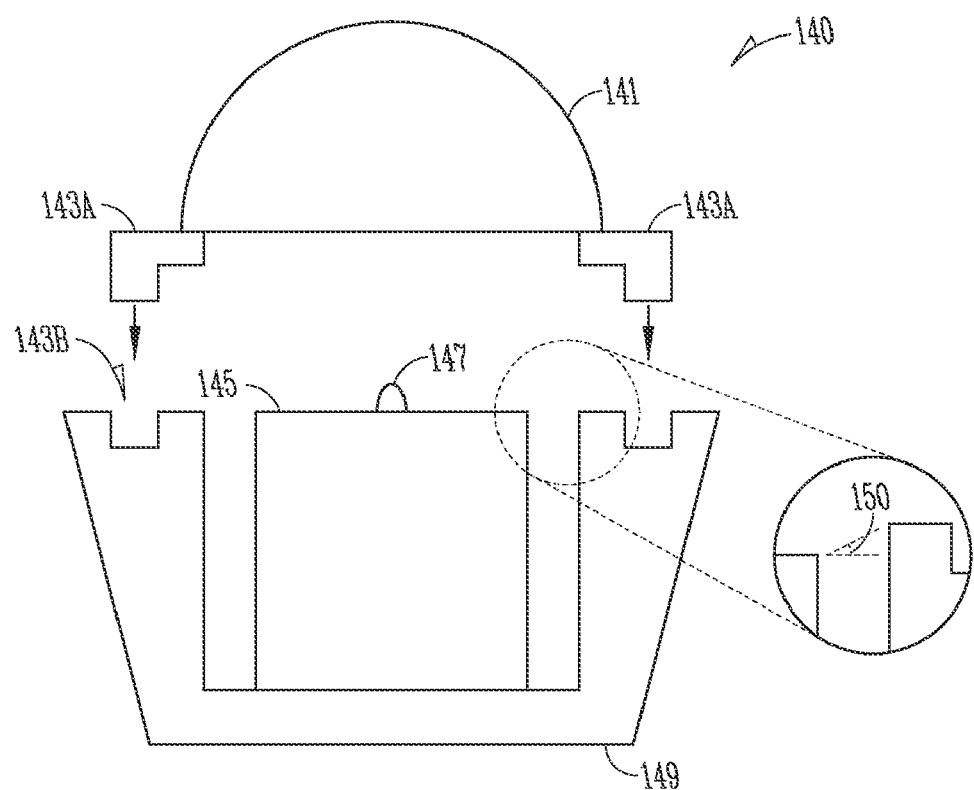
FIG. 1E is a cross-section view of a lamp body in an enclosure and an integrated electromagnetic shield according to another example embodiment.

Referring now to FIG. 1E, a cross-section view of a lamp body in an enclosure and an integrated electromagnetic shield is shown. A lamp 140 is shown to include an electrically conductive enclosure, housing, or puck heat sink 149. In this embodiment, an integrated electromagnetic shield includes a dome-shaped mesh 141 and an annular flange 143A. Although not shown directly in order to preserve clarity, the dome-shaped mesh 141 includes a number of wires (e.g., see the mesh 102, 203) effectively reducing any EMI radiation. Various example arrangements of the wires are described in detail, below.

The annular flange 143A may add strength to the dome-shaped mesh 141 preventing or reducing deformation of the dome-shaped mesh 141 while the integrated electromagnetic shield is being handled or installed. A lower-most portion of the annular flange 143A may function as an EMI gasket thus reducing or minimizing radiation emitted from the lamp 140.

The dome-shaped mesh 141 may be pressed or otherwise formed to act as an EMI shield. In an example embodiment, the dome-shaped mesh 141 is coupled to the annular flange 143A by means of clamping, bracing, soldering, welding, or other suitable means. Additionally or instead, the annular flange 143A can be affixed to the dome-shaped mesh 141 by chemical means, such as a thermally conductive adhesive, or by mechanical means, such as a mechanical press-fit.

A bulb 147 is mounted in a puck 145. The bulb 147 and the puck 145 may be similar to any of the other embodiments of bulbs and pucks described herein. The puck 145 is placed within the puck heat sink 149. The puck heat sink 149 serves to dissipate any heat generated by the puck 145 and the bulb 147. Additionally, in this embodiment, an annular groove 143B is formed in an uppermost portion of the puck heat sink 149. The annular groove 143B provides a mating surface for the lower most portion of the annular flange 143A. In a specific embodiment, the annular flange 143A may be press-fit into the annular groove to facilitate easy removal of the integrated electromagnetic shield to gain access to the bulb 147.

Although an uppermost surface of the puck 145 is shown in FIG. 1E as being substantially coplanar with the uppermost surface of the puck heat sink 149, such an arrangement may be readily modified. For example, the uppermost surface of the puck 145 may be fabricated such that an angle 150 (see inset of FIG. 1E) measured from an outside diameter of the upper surface of the puck 145 to an inside diameter of the upper surface of the puck heat sink 149 is within plus or minus 15°. If additional EMI shielding is desirable, depending upon, for example, local regulations concerning emission characteristics of plasma lamps, the upper surface of the puck 145 can be lower than the upper surface of the puck heat sink 149. This arrangement may provide for additional shielding while limiting useful visible light lost from the bulb 147.

Referring again to the dome-shaped mesh 141 and as described by way of example above, a sparse mesh with large wire-to-wire spacing will transmit more light, but will not provide as much shielding. The wires may be arranged on a rectangular, hexagonal, or radial grid, or any other geometrical or non-geometrical pattern with uniform or non-uniform spacing. By using either a radial mesh or a non-uniformly spaced mesh, the mesh density and therefore the shielding may be increased only in areas with relatively stronger electric fields while not obstructing the visible light path unnecessarily in areas with relatively weak electric fields. In specific example embodiments, an open area of the mesh can be up to 90%. In general, a range of open area of from 70% to 90% may limit the amount of visible light lost from the bulb while still effectively reducing EMI emissions.

The wires themselves may be fabricated from any non-oxidizing metal or other electrically conductive material provided that the material used in fabrication can withstand temperatures generated by the bulb 147. For example, the bulb 147 may operate at 850° C. and generate temperatures from approximately 100° C. to 150° C. at a distance of 25 mm from the bulb 147. Thus, materials to form the wires should be chosen to withstand these temperatures. Materials such as treated steels including, for example, various grades of stainless steel may be employed. Additionally, plated wires such as CuSil® or other types of plated material independently known in the art are suitable materials as well.

The wires themselves may have a range of sizes and spacings. For example, wire thicknesses can range from 1 mil to 20 mils in diameter with spacing between wires having a center-to-center distance from approximately 1 mm to 5 mm Further, in addition to round wires, other cross-sections of wire such as flat, rectangular, or tubular can be used as well. Additionally, since EMI emissions dissipate with distance, the dome-shaped mesh 141 or any of the other designs described herein may be fabricated to have a larger open area as the distance increases from the bulb 147. This arrangement may allow for greater transmission of visible light in an on-axis direction of the bulb 147 while still effectively reducing EMI radiation. Various arrangements incorporating this technique are discussed in detail by way of example below.

Figure 1F:
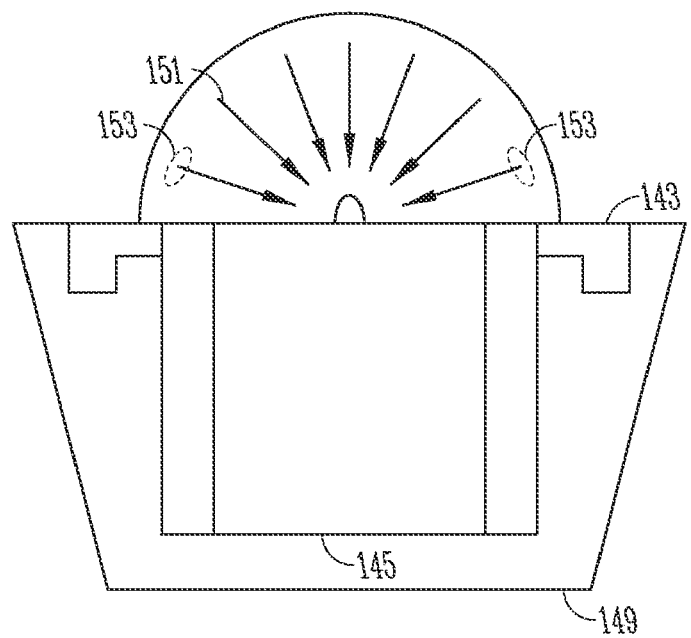
FIG. 1F is a cross-section view of a lamp body in an enclosure with an integrated electromagnetic shield indicating a high-EMI area according to another example embodiment.

Referring now to FIG. 1F, a cross-section view of a lamp body in an enclosure with an integrated electromagnetic shield indicating a high-EMI area is shown. The dome-shaped mesh 141 (see FIG. 1E) is shown to be attached to the puck heat sink 149. A number of electric field lines 151 are indicated in addition to a high EMI region 153. (A skilled artisan will recognize that the high EMI region 153 is actually located in a toroidal-like region about the bulb 147 and not merely in two locations as indicated.) As discussed above, the dome-shaped mesh 141 and the annular flange 143A may at least partially contain electric field energy within the dome-shaped mesh 141, near the bulb 147, and prevent or reduce the electric field energy from radiating outward away from the bulb 147 and the puck 145. Even employing a simple mechanical press-fit between the dome-shaped mesh 141 and annular flange 143A combination when assembled onto the puck heat sink 149, the contact resistance may be sufficiently low that the mesh assembly and heat sink form a continuous electrical ground. Consequently, the dome-shaped mesh 141 may keep the EMI emitted from the bulb 147 substantially contained while allowing visible light from the bulb to be transmitted through the dome-shaped mesh 141. Thus, a combination of wire thickness and wire-to-wire spacing within the dome-shaped mesh 141, as described above, control a trade-off between EMI containment and visible light transmission. Also as noted above, a larger open area increases visible light transmission while EMI containment is reduced. Therefore, various configurations of the EMI mesh may be considered for various applications.

Figure 1G:
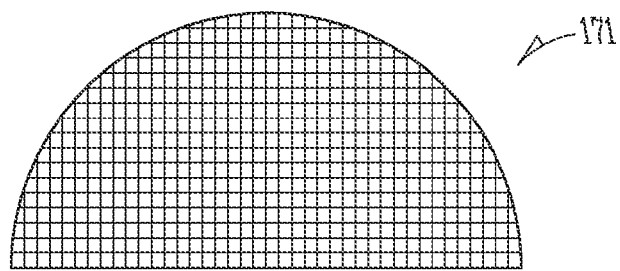
FIG. 1G is an elevational view of a dome-shaped electromagnetic shield according to an example embodiment.
Figure 1H:
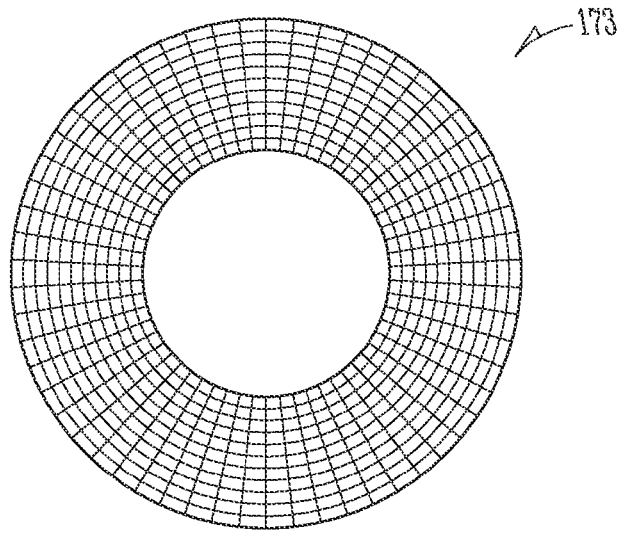
FIG. 1H is a plan view of another dome-shaped electromagnetic shield according to an example embodiment.
Figure 1I:
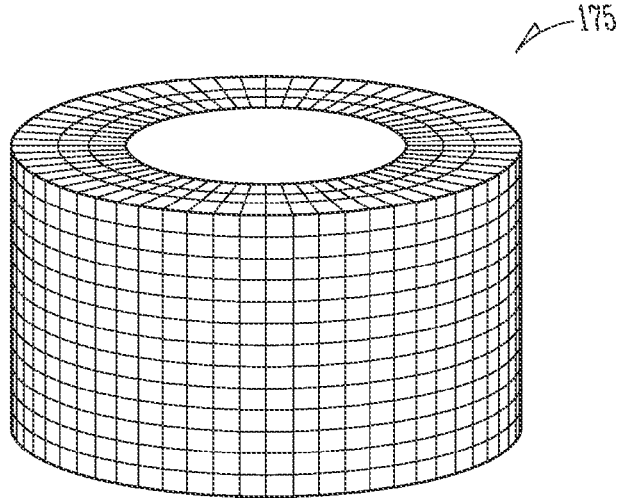
FIG. 1I is a perspective view of a cylindrically shaped electromagnetic shield according to an example embodiment.

For example, an elevational view of a dome-shaped electromagnetic shield of FIG. 1G is shown to include a dome mesh 171 having a substantially uniform array of wires. However, as noted above with reference to FIG. 1F, the high EMI region 153 is located nearer to the bulb (not shown in FIG. 1G). Thus, the plan view of another dome-shaped electromagnetic shield of FIG. 1H shows a modified dome-shaped mesh 173 having a central area devoid of any wires. The modified dome-shaped mesh 173 can therefore effectively substantially contain EMI emitted from the bulb in the high EMI region 153 (see FIG. 1F), while at the same time provide no attenuation to visible light directed in a near forward or on-axis direction of the bulb. In addition to the dome shaped EMI shield described above, other shapes can also be readily employed. For example, FIG. 1I shows perspective view of a cylindrically shaped electromagnetic shield. An example embodiment includes a cylindrical EMI shield 175. Based on the discussion contained herein, a skilled artisan will recognize that various other shapes such as a mesh cube, a semi-paraboloid, a mesh rectangle, (not shown but readily envisioned based on the discussion herein) or various other structures can also be readily employed. Such structures are generally considered as convex electromagnetic shields; the convex surface being considered with reference to an outer surface of the shield. Additionally, each of the structures described can be fabricated with various wire diameters, wire-to-wire spacing, or other wire shapes and arranged uniformly or non-uniformly in radial, grid arrays, or other geometric constructions as discussed. In addition, various combinations of these EMI mesh designs can be coupled with various ones of the cones, glass windows, and other designs discussed, above.

In example embodiments, the electrodeless plasma lamp according to example embodiments may be used in street and area lighting, entertainment lighting or architectural lighting or other lighting applications. In particular examples, the lamp is used in overhead street lighting fixtures, moving head entertainment fixtures, fixed spot fixtures, architectural lighting fixtures or event lighting fixtures.

Figure 2A:
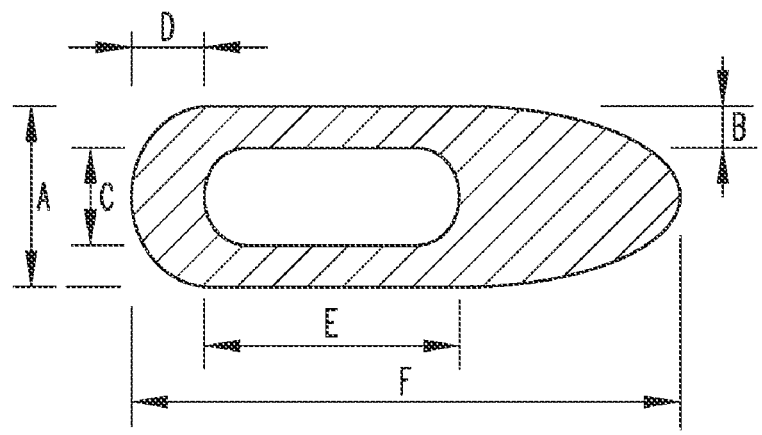
FIG. 2A is a side cross-section of a bulb according to an example embodiment.

FIG. 2A shows a side cross-section of a bulb. In some examples, the bulb may be quartz, sapphire, ceramic or other desired bulb material and may be cylindrical, pill shaped, spherical or other desired shape. In an example embodiment, the bulb is cylindrical in the center and forms a hemisphere at each end. In one example, the outer length F (from tip to tip) is about 15 mm and the outer diameter A (at the center) is about 5 mm. In this example, the interior of the bulb (which contains the fill) has an interior length E of about 9 mm and an interior diameter C at the center) of about 2.2 mm The wall thickness B is about 1.4 mm along the sides of the cylindrical portion. The wall thickness D at the front end is about 2.25 mm The wall thickness at the other end is about 3.75 mm. In this example, the interior bulb volume is about 31.42 mm$^3$. In example embodiments where power is provided during steady-state operation at between about 150-200 watts (or any range subsumed therein), this results in a power density in the range of about 4.77 watts per mm$^3$ to 6.37 watts per mm$^3$ (4770 to 6370 watts per cm$^3$) or any range subsumed therein. In this example embodiment, the interior surface area of the bulb is about 62.2 mm$^2$ (0.622 cm$^2$) and the wall loading (power over interior surface area) is in the range of about 2.41 watts per mm$^2$ to 3.22 watts per mm$^2$ (241 to 322 watts per cm$^2$) or any range subsumed therein.

In another example embodiment, the interior of the bulb (which contains the fill) has an interior length E of about 9 mm and an interior diameter C at the center) of about 2 mm The wall thickness B is about 1.5 mm along the sides of the cylindrical portion. The wall thickness D at the front end (through which light is transmitted out of the lamp) is about 2.25 mm. In this example embodiment, the interior bulb volume is about 26.18 mm$^3$ The wall thickness at the other end is about 3.75 mm. In example embodiments where power is provided during steady-state operation at between about 150-200 watts (or any range subsumed therein), this results in a power density in the range of about 5.73 watts per mm$^3$ to 7.64 watts per mm$^3$ (5730 to 7640 watts per cm$^3$) or any range subsumed therein. In this example embodiment, the interior surface area of the bulb is about 56.5 mm$^2$ (0.565 cm$^2$) and the wall loading (power over interior surface area) is in the range of about 2.65 watts per mm$^2$ to 3.54 watts per mm$^2$ (265 to 354 watts per cm$^2$) or any range subsumed therein.

Figure 2B:
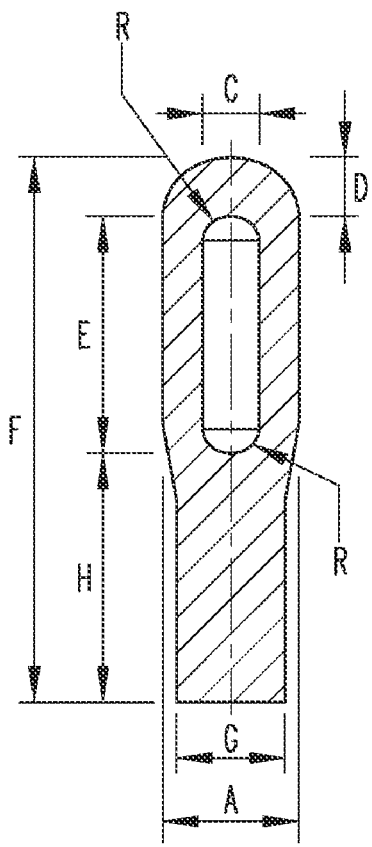
FIG. 2B is a side cross-section of a bulb with a tail according to an example embodiment.

In another example embodiment shown in FIG. 2B, the bulb may have a tail extending from one end of the bulb. In some embodiments, the length of the tail (indicated at H in FIG. 2G) may be between about 2 mm and 25 mm or any range subsumed therein. In some example embodiments, a longer or shorter tail may be used. In one example embodiment, the length of the tail, H, is about 9.5 mm. In this example embodiment, the outer length of the bulb (excluding the tail) is about 15 mm and the outer diameter A (at the center) is about 5 mm In this example embodiment, the interior of the bulb (which contains the fill) has an interior length E of about 9 mm and an interior diameter C at the center) of about 2.2 mm The wall thickness B is about 1.4 mm along the sides of the cylindrical portion. The wall thickness D at the front end is about 2.25 mm. The radius R is about 1.1 mm. In this example embodiment, the interior bulb volume is about 31.42 mm$^3$. The tail may be formed by using a quartz tube to form the bulb. The tube is sealed at one end forming the front end of the bulb. The bulb is filled through the open end of the tube and sealed. The sealed tube is then placed in a liquid nitrogen bath and a torch is used to collapse the tube at the other end of the lamp, which seals the bulb and forms the tail. The collapsed tube is then cut for the desired tail length.

In another example embodiment as shown in FIG. 2B, the bulb inner shape may be a nominal cylinder with two hemispheres at the ends having about the same radius as the cylindrical part. In this example, the inner length E is about 14 mm, the inner diameter C is about 4 mm (with an inner radius of about 2 mm), the outer diameter A is about 8 mm (with an outer radius of about 4 mm), and the length of the bulb (excluding the tail) is about 20 mm. In this example, the length of the tail H is about 10 mm.

In some example embodiments, the tail may be used as a light pipe to sense the level of light in the bulb. This may be used to determine ignition, peak brightness or other state information regarding the lamp. Light detected through the tail can also be used by the lamp drive circuit 106 (see FIG. 1A) for dimming and other control functions. A photodiode (not shown) can sense light from the bulb through the tail. The level of light can then be used by the lamp drive circuit 106 to control the lamp. The back of the lamp can be enclosed by a cover to avoid interference from external light from the surrounding environment. This isolates the region where light is detected by the photodiode and helps avoid interference that might be present if light is detected from the front of the lamp.

In some example embodiments, the tail may be used to align the bulb and mount it in position. For example, the recess 118 (see FIG. 1A) may be packed with alumina powder. A plate or cement or other material may be used to cover the back of the recess 118 and hold the powder in place. This layer forms a rigid structure to which the bulb tail may be mounted and fixed in position relative to the lamp body. For example, a layer of cement may be placed across the back surface of the powder and the tail of the bulb may be placed in the cement before it is cured. The cured cement holds the bulb in place and forms a rigid layer that is fixed in position relative to the lamp body. In some example embodiments, the tail may also provide additional heat sinking to the back end of the bulb. To the extent that the dose amounts result in a condensed pool of metal halide during lamp operation, the tail helps form the pool at the cooler region at the back of the bulb, rather than at the front of the bulb through which light is transmitted out of the lamp.

In other example embodiments, the bulb may have an interior width or diameter in a range between about 2 and 30 mm or any range subsumed therein, a wall thickness in a range between about 0.5 and 4 mm or any range subsumed therein, and an interior length between about 2 and 30 mm or any range subsumed therein. In example embodiments, the interior bulb volume may range from 10 mm$^3$ and 750 mm$^3$ or any range subsumed therein. In some embodiments, the bulb volume is less than about 100 mm$^3$. In example embodiments where power is provided during steady-state operation at between about 150-200 watts, this results in a power density in the range of about 1.5 watts per mm$^3$ to 2 watts per mm$^3$ (1500 to 2000 watts per cm$^3$) or any range subsumed therein. In this example embodiment, the interior surface area of the bulb is about 55.3 mm$^2$ (0.553 cm$^2$) and the wall loading (power over interior surface area) is in the range of about 2.71 watts per mm$^2$ to 3.62 watts per mm$^2$ (271 to 362 watts per cm$^2$) or any range subsumed therein. In some embodiments, the wall loading (power over interior surface area) may be 1 watt per mm$^2$ (100 watts per cm$^2$) or more. These dimensions are examples only and other embodiments may use bulbs having different dimensions. For example, some embodiments may use power levels during steady-state operation of 400-500 watts or more, depending upon the target application.

In example embodiments, the bulb 104 (see FIG. 1A) contains a fill that forms a light emitting plasma when radio frequency power is received from the lamp body 102. The fill may include a noble gas and a metal halide. Additives such as Mercury may also be used. An ignition enhancer may also be used. A small amount of an inert radioactive emitter such as $Kr_{85}$ may be used for this purpose. Some example embodiments may use a combination of metal halides to produce a desired spectrum and lifetime characteristics. In some example embodiments, a first metal halide is used in combination with a second metal halide. In some example embodiments, the first metal halide is Aluminum Halide, Gallium Halide, Indium Halide, Thallium Halide, and Cesium Halide and the second metal halide is a halide of a metal from the Lanthanide series. In example embodiments, the does amount of the first metal halide is in the range of from about from 1 to 50 micrograms per cubic millimeter of bulb volume, or any range subsumed therein and the dose amount of the second metal halide is in the range of from about from 1 to 50 micrograms per cubic millimeter of bulb volume, or any range subsumed therein. In some embodiments, the dose of the first metal halide and the dose of the second metal halide are each in the range of from about 10 to 10,000 micrograms or any range subsumed therein. In example embodiments, these dose amounts result in a condensed pool of metal halide during lamp operation. A noble gas and additives such as Mercury may also be used. In example embodiments, the dose amount of Mercury is in the range of 10 to 100 micrograms of Mercury per mm$^3$ of bulb volume, or any range subsumed therein. In some embodiments, the dose of Mercury may be in the range of from about 0.5 to 5 milligrams or any range subsumed therein. An ignition enhancer may also be used. A small amount of an inert radioactive emitter such as Kr$_{85}$ may be used for this purpose. In some example embodiments, Kr$_{85}$ may be provided in the range of about 5 nanoCurie to 1 microCurie or any range subsumed therein.

In a particular example embodiment, the fill includes the first metal halide as an Iodide or Bromide in the range from about 0.05 mg to 0.3 mg or any range subsumed therein, and the second metal halide as an Iodide or Bromide in the range from about 0.05 mg to 0.3 mg or any range subsumed therein. Chlorides may also be used in some embodiments. In some example embodiments, the first metal halide and the second metal halide are provided in equal amounts. In other embodiments, the ratio of the first metal halide to the second metal halide may be 10:90, 20:80, 30:70, 40:60, 60:40, 70:30, 80:20 or 90:10.

In some example embodiments, the first metal halide is Aluminum Halide, Gallium Halide, Indium Halide, or Thallium Halide (or a combination of Aluminum Halide, Gallium Halide, Indium Halide, and/or Thallium Halide). In some example embodiments, the first metal halide may be Cesium Halide (or Cesium Halide in combination with Aluminum Halide, Gallium Halide, Indium Halide, and/or Thallium Halide). In other example embodiments, the dose does not include any Alkalai metals. In some example embodiments, the second metal halide is Holmium Halide, Erbium Halide, or Thulium Halide (or a combination of one or more of these metal halides). In these example embodiments, the first metal halide may be provided in a dose amount in the range of about 0.3 mg/cc to 3 mg/cc or any range subsumed therein and the second metal halide may be provided in a dose amount in the range of about 0.15 mg/cc to 1.5 mg/cc or any range subsumed therein. In some example embodiments, the first metal halide may be provided in a dose amount in the range of about 0.9 mg/cc to 1.5 mg/cc or any range subsumed therein and the second metal halide may be provided in a dose amount in the range of about 0.3 mg/cc to 1 mg/cc or any range subsumed therein. In some example embodiments, the first metal halide is provided in a larger dose amount than the second metal halide. In some examples, the first metal halide is Aluminum Bromide or Indium Bromide and the second metal halide is Holmium Bromide. In some example embodiments, the fill also includes Argon or another noble gas at a pressure in the range of about 50 to 760 Torr or any range subsumed therein. In some example embodiments, the pressure is 100 Torr or more or 150 Torr or more or may be at higher pressures as described below. In one example, Argon at 150 Torr may be used. Mercury and an inert radioactive emitter such as Kr$_{85}$ may also be included in the fill. In some example embodiments, a power of 100 watts or more may be provided to the lamp. In some example embodiments, the power is in the range of about 150 to 200 watts, with 170 watts being used in a particular example. The wall loading may be 1 watts per mm$^2$ (100 watts per cm$^2$) or more. A thermally conductive material, such as alumina powder, may be in contact with the bulb to allow high wall loading to be used as described below. In some example embodiments, as described further below, these fills may be used to provide 15,000 to 20,000 lumens (or any range subsumed therein) when operated at 150 to 200 watts (or any range subsumed therein). This can provide a luminous efficiency of 100 lumens per watt or more in some embodiments. Example embodiments may also provide at a correlated color temperature of 4000° K. to 10000° K. (or any range subsumed therein) with a bulb geometry enabling the collection of 4500 to 5500 lumens (or any range subsumed therein) in 27 mm$^2$ steradian when operated at 150 to 200 watts (or any range subsumed therein). In some example embodiments, the fill may be selected to provide a correlated color temperature in the range of 6000° K. to 9000° K.

Other metal halides may also be used in other example embodiments, including Bromides, Iodides and Chlorides of Indium, Aluminum, Gallium, Thallium, Holmium, Dysprosium, Cerium, Cesium, Erbium, Thulium, Lutetium, and Gadolinium. Other metal halides may also be used in other embodiments, including Bromides, Iodides and Chlorides of Sodium, Calcium, Strontium, Yttrium, Tin, Antimony, Thorium and any of the elements in the Lanthanide series.

Some example embodiments may use a combination of metal halides to produce a desired spectrum. In some examples, one or more metal halides with strong emission in the blue color range (such as halides of Aluminum, Cesium, Gallium, Indium, and/or Scandium) may be combined with one or more metal halides to enhance emission in the red color range (such as halides of Sodium, Calcium, Strontium, Gadolinium, Dysprosium, Holmium, Erbium, and/or Thulium). In particular example embodiments, the fill may include (1) Aluminum Halide and Holmium Halide; (2) Aluminum Halide and Erbium Halide; (3) Gallium Halide and Holmium Halide; (4) Gallium Halide and Erbium Halide; (5) any of these fill further including Indium Halide; (6) any of these fills further including an alkali metal halide such as Sodium Halide or Cesium Halide (although other examples may specifically exclude all alkali metals); and (7) any of these fills further including Cerium Halide.

In an example embodiment, the metal halide(s) may be provided in the range from about 0.01 mg to 10 mg or any range subsumed therein and Mercury may be provided in the range of about 0.01 to 10 mg or any range subsumed therein. In example embodiments, the fill includes 1 to 100 micrograms of metal halide per mm$^3$ of bulb volume, or any range subsumed therein, 1 to 100 micrograms of Mercury per mm$^3$ of bulb volume, or any range subsumed therein, and 5 nanoCurie to 1 microCurie of a radioactive ignition enhancer, or any range subsumed therein. In other examples, the fill may include a dose of one or more metal halides in the range of about 1 to 100 micrograms of metal halide per mm$^3$ of bulb volume without Mercury. In some embodiments using more than one metal halide, the total dose may be in any of the above ranges and the percentage of each metal halide may range from 5% to 95% of the total dose or any range subsumed therein.

These doses are examples only and other embodiments may use different doses and/or different fill materials. In other embodiments, different fills such as Sulfur, Selenium, or Tellurium may also be used. In some examples, a metal halide such as Cesium Bromide may be added to stabilize a discharge of Sulfur, Selenium, or Tellurium. Metal halide may also be added to a fill of Sulfur, Selenium, or Tellurium to change the spectrum of the discharge.

In some example embodiments, a high-pressure fill is used to increase the resistance of the gas. This can be used to decrease the overall startup time required to reach full brightness for steady-state operation. In one example, a noble gas such as Helium, Neon, Argon, Krypton, or Xenon, or another substantially non-reactive gas such as Nitrogen, or a combination of these gases is provided at high pressures between 200 Torr to 3000 Torr or any range subsumed therein. Pressures less than or equal to 760 Torr may be desired in some embodiments to facilitate filling the bulb at or below atmospheric pressure. In particular embodiments, pressures between 400 Torr and 600 Torr are used to enhance starting.

Example high pressure fills may also include metal halide (or a combination of metal halides as described above) and Mercury that have a relatively low vapor pressure at room temperature. Example metal halide and Mercury fills include, but are not limited to, the fills described in Table 1, below. A bulb as described in connection with FIG. 2A or FIG. 2B may be used with these fills in example embodiments. In one example, the bulb has a volume of about 31.42 mm$^3$ as described above.

TABLE 1

| Fill | InBr | DyI$_3$ | CeI$_3$ | HoBr$_3$ | AlBr$_3$ | ErBr$_3$ | GdI$_3$ | HoI$_3$ | Hg |
| --- | --- | --- | --- | --- | --- | --- | --- | --- | --- |
| #1 | 0.1 mg | 0.1 mg | 0 | 0 | 0 | 0 | 0 | 0 | 2.7 mg |
| #2 | 0.1 mg | 0 | 0.1 mg | 0 | 0 | 0 | 0 | 0 | 2.7 mg |
| #3 | 0 | 0 | 0 | 0.05 mg | 0.05 mg | 0 | 0 | 0 | 1.35 mg |
| #4 | 0.1 mg | 0 | 0 | 0 | 0.1 mg | 0 | 0 | 0 | 2.7 mg |
| #5 | 0.1 mg | 0 | 0 | 0 | 0 | 0 | 0.1 mg | 0 | 2.7 mg |
| #6 | 0.1 mg | 0 | 0 | 0 | 0 | 0 | 0 | 0.1 mg | 2.7 mg |
| #7 | 0.1 mg | 0 | 0 | 0 | 0 | 0 | 0 | 0 | 1.6 mg |
| #8 | 0 | 0 | 0 | 0 | 0.05 mg | 0.05 mg | 0 | 0 | 1.35 mg |
| #9 | 0.03 mg | 0 | 0 | 0.01 mg | 0 | 0 | 0 | 0 | 1.4 mg |
| #10 | 0.03 mg | 0 | 0 | 0.03 mg | 0 | 0 | 0 | 0 | 1.4 mg |
| #11 | 0.05 mg | 0 | 0 | 0.01 mg | 0 | 0 | 0 | 0 | 1.4 mg |
| #12 | 0.05 mg | 0 | 0 | 0.03 mg | 0 | 0 | 0 | 0 | 1.4 mg |

In example embodiments, these dose amounts result in a condensed pool of metal halide during lamp operation. These fills can also be used without Mercury in some embodiments. In these examples, Argon or Krypton is provided at a pressure in the range of about 50 Torr to 760 Torr, depending upon desired startup characteristics. Some embodiments may use higher pressures. Initial breakdown of the noble gas is more difficult at a higher pressure, but the overall warm up time required for the fill to substantially vaporize and reach peak brightness is reduced. The above fills may be used with or without an ignition enhancer. In some embodiments, these fills include Kr$_{85}$ in the range of about 5 nanoCurie to 1 microCurie or any range subsumed therein. Higher levels of ignition enhancer can be used to provide almost instantaneous ignition. The above pressures are measured at 22° C. (e.g., approximately room temperature). It is understood that much higher pressures are achieved at operating temperatures after the plasma is formed. For example, the lamp may provide a high intensity discharge at high pressure during operation (e.g., greater than 2 atmospheres and 10 to 100 atmospheres or more in example embodiments or any range subsumed therein). These pressures and fills are examples only and other pressures and fills may be used in other embodiments.

In a particular example embodiment, the fill includes about 0.5 μliter of Hg, about 0.1 mg of InBr, and about 0.01 mg of HoBr3. In this example, with reference to FIG. 2B, the bulb inner shape may be a nominal cylinder with two hemispheres at the ends having about the same radius as the cylindrical part, the inner length E is about 14 mm, the inner diameter C is about 4 mm (with an inner radius of about 2 mm), the outer diameter A is about 8 mm (with an outer radius of about 4 mm), and the length of the bulb (excluding the tail) is about 20 mm. In this example, the length of the tail H is about 10 mm.

In another example, the bulb has a volume of about 31.42 mm cubed and the fill includes 0.01 milligram of InBr and 0.005 mg of HoBr3. In another example embodiment, the bulb has a volume of about 31.42 mm cubed and the fill includes 0.01 milligram of InBr and 0.005 mg of ErBr3. These fills may also include 1.4 mg of Mercury or may be Mercury free in some example embodiments. The fill may also include Kr$_{85}$ as an ignition enhancer in the dose ranges described, above. In this example embodiment, Argon or Krypton is provided at a pressure in the range of about 100 Torr to 200 Torr, depending upon desired startup characteristics. Some embodiments may use higher or lower pressures. Initial breakdown of the noble gas is more difficult at higher pressure, but the overall warm up time required for the fill to substantially vaporize and reach peak brightness is reduced.

FIG. 2H shows an example embodiment of the spectrum produced by a fill having a spectral power distribution 202 for a lamp of the type shown in FIG. 1A containing the example InBr/HoBr3 fill in microwatts per nanometer as collected in 27 mm$^2$ steradian at about 140 W operating power provided to the lamp. A spectral power distribution 204 for an Indium Bromide fill is shown for comparison. As shown in FIG. 2H, the Indium/Holmium fill provides a brighter and more balanced spectrum. For example, the total radiated power between about 300 nm to 1000 nm collected in 27 mm$^2$ steradian at about 140 W operating power provided to the lamp is about 20.2 watts compared to 17.2 watts for Indium Bromide alone. In the range of 320 nm to 400 nm (part of the near UV spectrum, which may be useful for fluorescence excitation) the collected radiated power is about 1.8 watts for the In/Ho fill and 1.02 watts for In only. In the range of 400 nm to 700 nm (for visible illumination) the collected radiated power is about 15.9 watts for the In/Ho fill and 12.7 watts for In only. Each of the above can be expressed as a percentage of the total collected radiated power from 300 to 1000 nm in 27 mm$^2$ steradian and also as a percentage of input power to the lamp (in this case about 140 watts). In addition, the color rendering for the Indium/Holmium fill is greater than 95% (about 97% in some embodiments) compared to 85% to 89% for Indium only fills. In example embodiments, the above characteristics are obtained for collected light in 30 mm$^2$ steradian or less.

A plasma arc produced in example embodiments is stable with low noise. Power is coupled symmetrically into the center region of the bulb from the lamp body and is not disturbed by electrodes in the bulb (or degradation of those electrodes).

The drive circuit and operation of an example lamp will now be described with concurrent reference to FIG. 1A and FIG. 3A. The lamp drive circuit 106 includes a voltage-controlled oscillator (VCO) 130, an RF modulator 135, an attenuator 137, an amplifier 124, a low pass filter 126, a current sensor 136, a microprocessor 132 or other controller, and a radio frequency power detector 134. The VCO 130 is used to provide radio frequency power to the lamp at a desired frequency under control of the microprocessor 132. The radio frequency power is amplified by the amplifier 124 and provided to the lamp body 102 through the low pass filter 126. The current sensor 136 and the radio frequency power detector 134 may be used to detect the level of current and reflected power to determine a state of operation of the lamp. The microprocessor 132 uses the information from the current sensor 136 and the radio frequency power detector 134 to control the VCO 130, the RF modulator 135, and the attenuator 137 during startup and operation of the lamp, including startup, steady-state operation and dimming, and other control functions. In some embodiments, the microprocessor 132 may also control the gain of the amplifier 124.

The power to the lamp body 102 may be controlled by the lamp drive circuit 106 to provide a desired startup sequence for igniting the plasma. As the plasma ignites and heats up during the startup process, the impedance and operating conditions of the lamp change. In order to provide for efficient power coupling during steady-state operation of the lamp, the lamp drive circuit 106 is impedance matched to the steady-state load of the lamp body 102, the bulb 104, and plasma after the plasma is ignited and reaches steady-state operating conditions. This allows power to be critically coupled from the lamp drive circuit 106 to the lamp body 102 and plasma during steady-state operation. However, in an example embodiment, the power from the lamp drive circuit 106 is over-coupled to the lamp body 102 at ignition and during warm up of the plasma.

As described with reference to FIG. 3A, the VCO 130 provides RF power at a desired frequency to the amplifier 124 (for example, a multi-stage amplifier). In this example, the amplifier 124 is shown to include a pre-driver 124a, a driver 124b, and a gain stage 124c controlled by the microprocessor 132. In some embodiments, the gain stage 124c may include two parallel gain stages (the circuit trace may split into parallel lines feeding power into both amplifier gain stages in parallel and the output from both amplifier stages may be recombined on the output side of the amplifier). The amplified RF power is provided to the drive probe 120 inserted into the lamp body 102 through the low pass filter 126. The current sensor 136 samples current in the lamp drive circuit 106 and provides information regarding the current to the microprocessor 132. The radio frequency power detector 134 (which is shown to include a coupler 134a and RF detectors 134b) senses reflected or reverse power from the lamp body 102 and provides this information to the microprocessor 132. The microprocessor 132 uses these inputs to control the RF modulator 135 and the attenuator 137. The microprocessor also uses this information to control the frequency of the VCO 130. A spread spectrum circuit 331 between the microprocessor 132 and the VCO 130 can be used to adjust the signal to the VCO 130 to spread the frequencies over a range to reduce EMI as described, below.

Figure 3A:
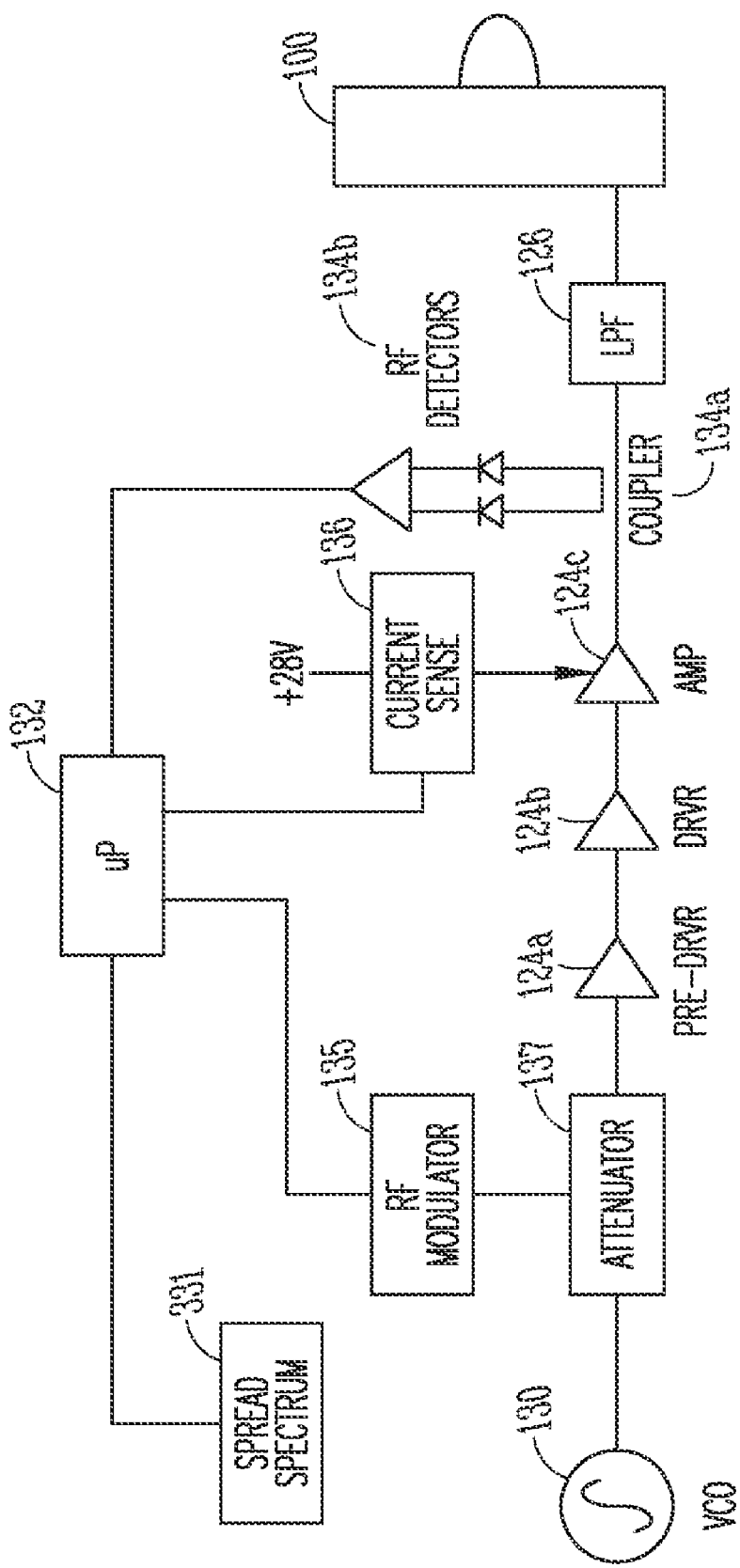
FIG. 3A is a block diagram of a drive circuit for an electrodeless plasma lamp according to an example embodiment.
Figure 3B:
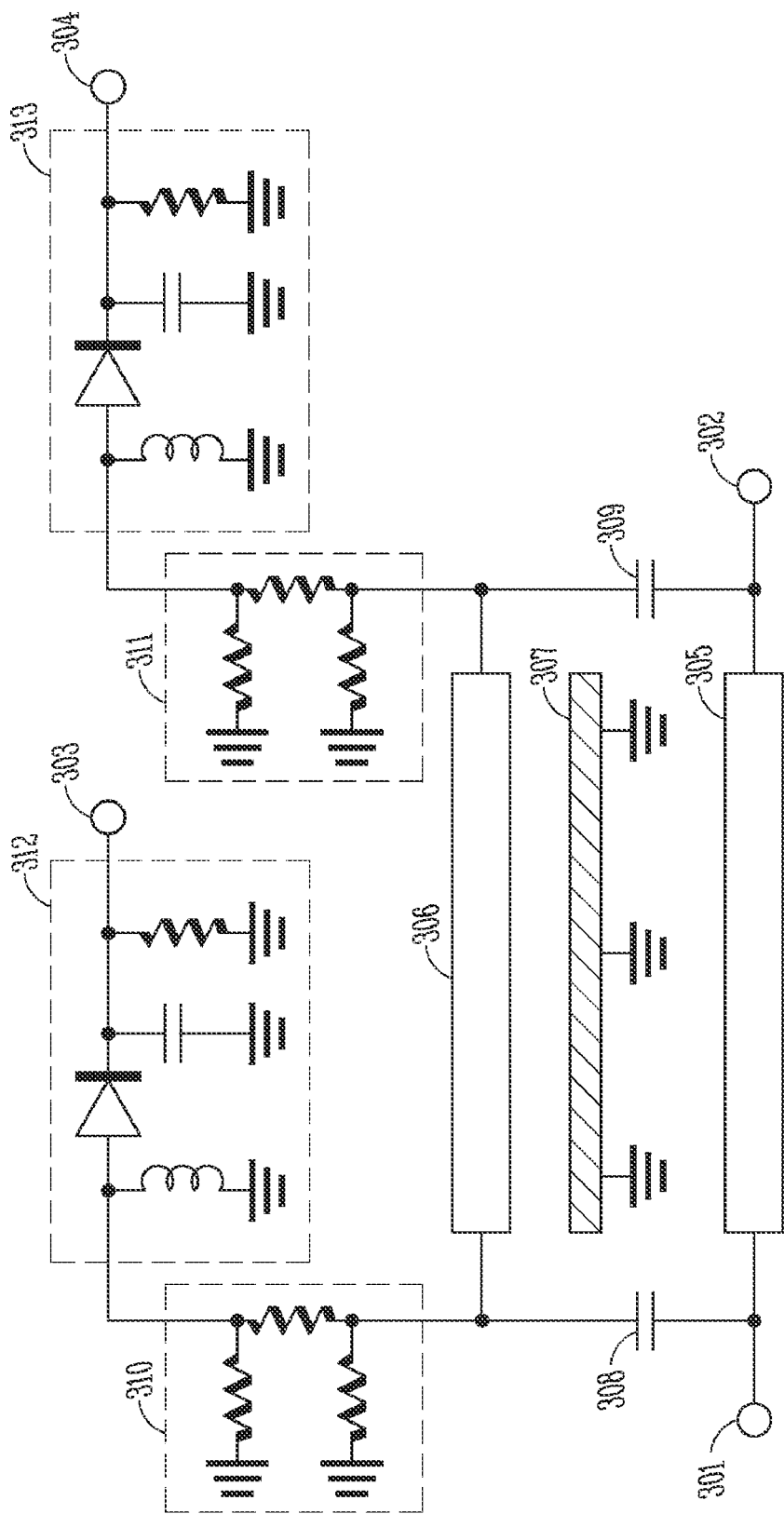
FIG. 3B is a block diagram of an RF power detector according to an example embodiment.

FIG. 3B shows a block diagram of an RF power detector that can be used for the radio frequency power detector 134 in some embodiments. The block diagram is shown to include an RF input port 301 coupled to the amplifier output, an RF output port 302 that is coupled to the lamp body 102, a DC output port 303 for detection of forward power, and a DC output port 304 for detection of reflected power. The example circuit also includes a length of a 50-ohm microstrip 305 to carry both forward and reflected power. As used below, $\lambda_m$ refers to the signal wavelength in the 50-ohm microstrip 305. In example embodiments, this length should not be within about $\lambda_m/20$ of any multiple of $\lambda_m/2$ for proper operation of the example circuit. In example embodiments, the length is an odd multiple of $\lambda_m/4$, although intermediate lengths are possible and may be desirable for minimizing the size of the circuit. The circuit also has a corresponding length of a 50-ohm microstrip 306 carrying a small sample of both forward and reflected power. In example embodiments, the total electrical length of 50-ohm microstrip 306 should be about $\angle 306 = \angle 305 + \lambda_m/2$ of the 50-ohm microstrip 306. In this example embodiment, the 50-ohm microstrips 305, 306 are isolated from each other, typically by better than 40 dB at the RF frequency.

The example circuit is also shown to include a grounded copper trace 307 between the 50-ohm microstrips 305, 306 to provide the required isolation, yet still allow a compact layout. An alternative is to space the 50-ohm microstrips 305, 306 far apart, typically at least five times the width of a 50-ohm line, measured from the edge of the 50-ohm microstrip 305 to the nearest edge of the 50-ohm microstrip 306. The circuit also includes sampling capacitors 308, 309 that pick up RF power from the 50-ohm microstrip 305 and transfer a small quantity of that power to the 50-ohm microstrip 306. Typical values of the sampling capacitors 308, 309 range from 0.1 pF to 1.0 pF. In some embodiments, each of the sampling capacitors 308, 309 may be split into two or more capacitors arranged in series so as not to exceed a breakdown voltage rating of the components. The circuit also includes attenuators 310, 311 with 50-ohm input and output impedances, and typical attenuation of 10 dB. These may be standard "pi" or "tee" resistor attenuators. The "pi" configuration is shown in the example circuit. Detector circuits 312, 313 convert the sampled RF power into a DC voltage. These may be standard single diode detectors, as shown in the example circuit, with an input inductor for video ground, a series diode, an output capacitor for RF ground, and an output load resistor.

Figure 3C:
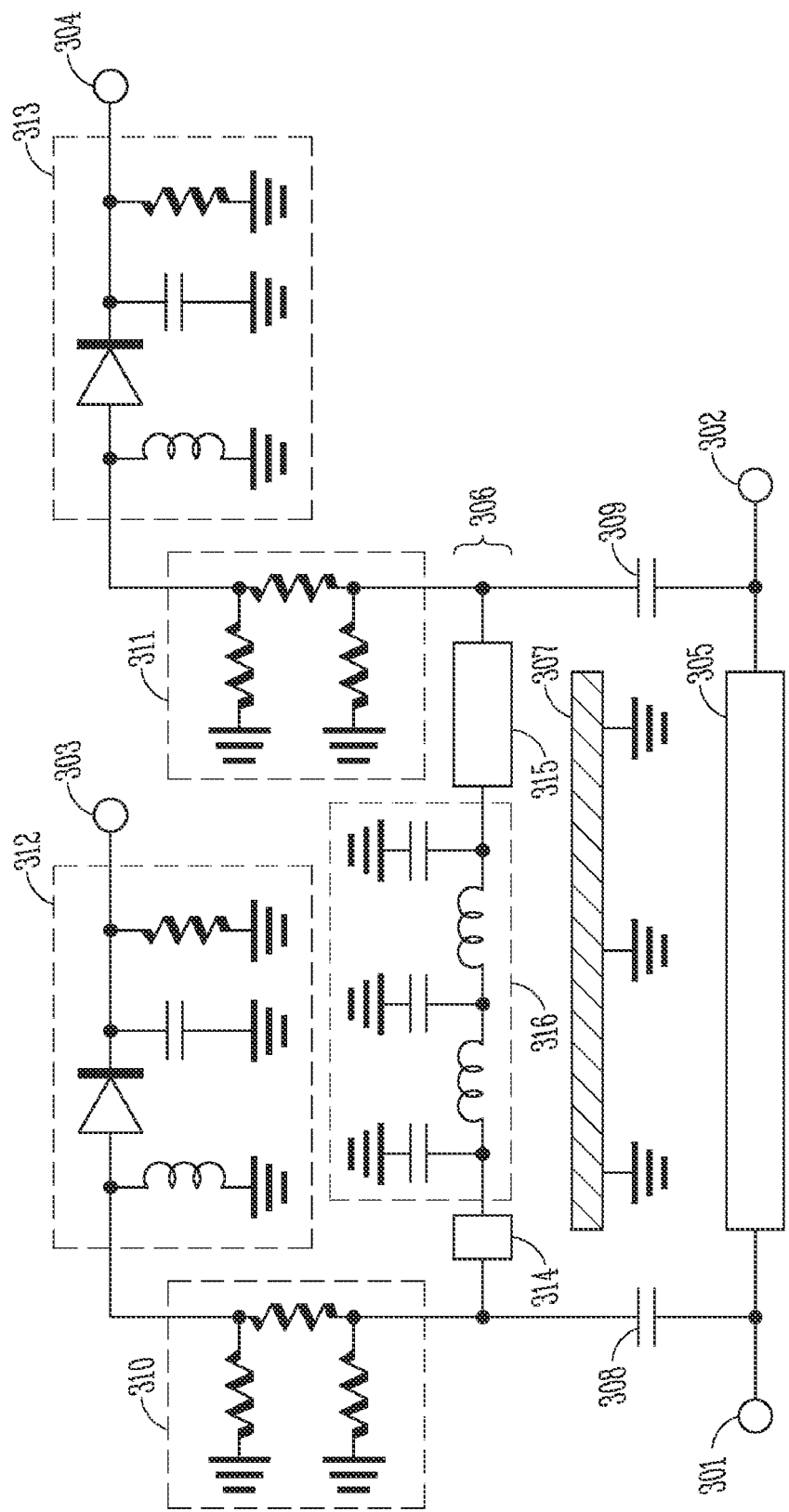
FIG. 3C is a block diagram of an RF power detector according to an alternative example embodiment.

FIG. 3C shows a block diagram of an alternative embodiment of an RF power detector. In this embodiment, the components are the same or similar to those described with reference to as FIG. 3B, except that the 50-ohm microstrip 306 comprises a first microstrip trace 314, a second microstrip trace 315, and a low-pass LC network 316. A total electrical length 306 is still $\angle 306 = \angle 305 + \lambda_m/2$. However, the low-pass LC network 316 has a greatly enhanced phase length compared to a microstrip trace with the same physical length as the low-pass LC network 316. This allows the 50-ohm microstrip 306 to be physically very short, while still satisfying the phase length condition. Typically, the 50-ohm microstrips 305, 306 will be approximately the same physical length despite the extra $\lambda_m/2$ electrical length of the 50-ohm microstrip 306.

In this example embodiment, the low-pass LC network 316 uses the "slow-wave" effect of lumped low-pass networks to achieve a large phase shift in a small space. Values of L and C are chosen to satisfy the phase requirements of the 50-ohm microstrip 306, and also to give a 50-ohm input and output impedance at the frequency of operation.

The operation of the example power-detector circuits will now be described. The example circuit works based on constructive and destructive interference of signals, depending on which path those signals take between the ports 301 to 304. For this example, $\angle 305 = \lambda_m/4$ is used, the optimal value. Consider the forward power coming from the amplifier entering the circuit at the RF input port 301, and determine what happens at the DC output port 303 due to that power. A first sample of the forward power arrives at the DC output port 303 through the sampling capacitor 308 with phase shift $\angle 308$. A second sample of the forward power arrives at the DC output port 303 through the path from the 50-ohm microstrip 305, to the sampling capacitor 309, to the 50-ohm microstrip 306, with a phase shift $\angle 305 + \angle 309 + \angle 306$. Since $\angle 308 = \angle 309$ (the capacitors are the same), the relative phase of the two samples at the DC output port 303 is zero versus $\angle 305 + \angle 306$. Due to the phase requirements of the example circuit, the relative phase becomes ∠0 versus $3\lambda_m/4$. Thus, there is some constructive interference at the DC output port 303 due to an input at the RF input port 301.

Consider now the forward power coming from the amplifier entering the example circuit at the RF input port 301, and determine what happens at the DC output port 304 due to that power. A first sample of the forward power arrives at the DC output port 304 through the path between the sampling capacitor 308 and the 50-ohm microstrip 306 with a phase shift of ∠308+∠306. A second sample of the forward power arrives at the DC output port 304 through the path from the 50-ohm microstrip 305 and the sampling capacitor 309 with a phase shift ∠305+∠309. Since ∠308=∠309 (the capacitors are the same), the relative phase of the two samples at the DC output port 304 is ∠305 versus ∠306. Due to the phase requirements of the example circuit, the relative phase becomes ∠0 versus $\lambda_g/2$. Consequently, there is total destructive interference at the DC output port 304 due to an input at the RF input port 301.

Since the example circuit is symmetric, it can be shown the same way that the reflected power from the lamp body 102, which enters the circuit at the RF output port 302, combines somewhat in-phase at the DC output port 304, and totally out of phase at the DC output port 303. Therefore, the DC output port 303 is the forward power output, and the DC output port 304 is the reflected power output.

In this example embodiment, the optimal electrical length of the 50-ohm microstrip 305 as an odd multiple of $\lambda/4$ makes the input impedance of the circuit at either the RF input port 301 or the RF output port 302 appear to be 50-ohms at the operating frequency. Any other choice makes the input impedance be somewhat different from 50-ohms, but the difference is small as long as the sampling capacitors 308, 309 are small capacitors. Typical values at 450 MHz are, for example, 0.5 pF.

The coupler circuits described with reference to FIGS. 3A and 3B can provide advantages over certain other coupler circuits. In finding the frequency of a resonant load, the load impedance can change significantly across frequency, degrading coupler performance. Specifically, the coupler parameter commonly known as directivity suffers when trying to measure reflected power from a resonant load that is excited with an off-resonant frequency. Poor directivity means that the forward power "leaks" into the reflected power detector, corrupting the measurement. The coupler circuits described with reference to FIGS. 3B and 3C avoid this problem.

In addition, the coupler circuit described with reference to FIGS. 3B and 3C can be made very small, even at low frequencies (large $\lambda_g$) due to the minimal constraints on phase lengths of the 50-ohm microstrips 305, 306, and also because the 50-ohm microstrip 306 can be physically shortened by the use of the low-pass LC network 316 while maintaining the required electrical length. While example embodiments of this coupler may not offer the accuracy required for some coupler applications, they can be used to make determinations of whether the load is on or off resonance with sufficient accuracy for example embodiments of the lamp and at low cost.

The operation of the overall example drive circuit for the lamp during ignition, warm up and run modes will now be described. During ignition, the microprocessor 132 ramps the VCO 130 through a series of frequencies until ignition is detected by detecting a sudden drop in reflected power from the radio frequency power detector 134. The microprocessor 132 also adjusts the RF modulator 135 and the attenuator 137 based on the current sensor 136 to maintain the desired current level in the circuit. Once a predetermined drop in reflected power level is detected indicating ignition, the microprocessor 132 enters a warm up state. During warm up, the microprocessor 132 ramps the frequency of the VCO 130 through a pre-defined range and keeps track of the reflected power from the detector at each frequency. The microprocessor 132 then adjusts the frequency to the level determined to have the lowest reflected power. Once the detector senses reflected power below a threshold level indicating completion of warm up, the microprocessor 132 enters run state. In run state, the microprocessor 132 adjusts the frequency up and down in small increments to determine whether the frequency should be adjusted to achieve a target reflected power level with the minimum current.

In some embodiments, ripple current can be detected in the lamp drive circuit 106 instead of or in addition to reflected power. When the frequency of the VCO 130 is modulated (for example, when the spread spectrum circuit 331 is used) and the circuit is off from the resonance frequency, a ripple current results in some example embodiments. Changes in current based on frequency increase as the frequency moves away from the resonant frequency. This causes a ripple when the frequency is spread by the spread spectrum circuit 331. As above, the VCO 130 can be incremented through ranges to find a frequency resulting in the lowest ripple current and to compare the ripple current against threshold values indicating ignition, warm up, and run state. In example embodiments, the ripple current may be used to determine and adjust the operating condition of the lamp instead of (or in addition to) RF power levels and/or a photodetector. In some cases, ripple current may have a better correlation to some lamp operating conditions to be detected by the lamp drive circuit 106 and reverse power may have a better correlation to other lamp operating conditions to be detected by the lamp drive circuit 106. In this case, ripple current and reflected power could each be detected and used when appropriate to determine lamp operating conditions to adjust the operation of the lamp. Lamp operating conditions to be detected by the lamp drive circuit 106 (and which may result in the microprocessor 132 adjusting the operation of the lamp drive circuit 106) may include, for example, ignition, warm up and run modes, failure modes (for example, where the lamp extinguishes after ignition without the lamp being turned off), and brightness adjustment.

In some embodiments, reverse power and/or ripple current may be used to control the lamp drive circuit 106 without a photodetector that detects light output from the lamp. This approach may facilitate deployment of the lamp in configurations where the lamp body 102 and the lamp drive circuit 106 are remote from one another. For example, a coaxial cable or other transmission line may be used to transmit power from the lamp drive circuit 106 to the drive probe 120 and the lamp body 102. In some configurations, such as street and area lighting, the lamp drive circuit 106 and other electronics may be deployed in a housing spaced apart from the lamp body 102 and/or fixture holding the lamp body 102. A cable may then feed the RF power to the drive probe 120 and the lamp body 102. In certain of these embodiments, it may be difficult to channel light detected from the output of the lamp back to the lamp drive circuit 106. The use of ripple current and/or reflected power to control the lamp drive circuit 106 avoids this issue.

In some embodiments, the lamp can be dimmed to low light levels less than 10%, 5%, or 1% of peak brightness or even less in some embodiments. In some embodiments, upon receiving the dimming command, the microprocessor 132 can adjust the attenuator 137 (and/or amplifier gain in some embodiments) to dim the lamp. The microprocessor 132 also continues to make small adjustments in frequency to optimize the frequency for the new target reflected power level for the desired operating conditions.

In an alternate embodiment, the lamp can be dimmed using pulse width modulation. The power may be pulsed on and off at a high frequency at different duty cycles to achieve dimming For example, in some embodiments, the pulse width modulation may occur at a frequency of 1 kHz to 1000 kHz or any range subsumed therein. In one example, a pulsing frequency of about 10 kHz may be used. This provides a period of about 0.1 milliseconds (100 microseconds). In another example, a pulsing frequency of about 500 kHz may be used. This provides a period of about 2 microseconds. In other examples, the period may range from about 1 millisecond (at 1 kHz) to 1 microsecond (at 1000 kHz) or any range subsumed therein. However, the plasma response time is slower, so the pulse width modulation does not turn the lamp off. Rather, an average power to the lamp can be reduced by turning the power off during a portion of the period according to a duty cycle. For example, the microprocessor 132 may turn off the VCO 130 during a portion of the period to lower the average power provided to the lamp. Alternatively, an attenuator may be used between the VCO 130 and the amplifier 124 to turn off the power. In other embodiments, the microprocessor 132 may switch on and off one of the low-power gain stages of the amplifier 124, such as the pre-driver 124a. For example, if the duty cycle is 50%, the power will be off half of the time and the average power to the lamp will be cut in half (resulting in a dimming of the lamp).

This type of dimming may be advantageous over dimming by adjusting the gain of the amplifiers in some embodiments, because the amplifier 124 can be kept in a more efficient operating range when power is applied. For example, when the power is on during the duty cycle, the amplifier 124 remains closer to peak power and/or saturation rather than operating the amplifier 124 at lower gain and efficiency for dimming In example embodiments, the duty cycle may range from 1% to 99% or any range subsumed therein. In some embodiments, when complete dimming is desired (e.g., no light output), the lamp may be dimmed to a low level (for example 1% to 5% of full brightness or less in some embodiments) using pulsing and a mechanical shutter (not shown) can be used to block the light. In this example, the lamp remains ignited, so it can rapidly be brought back up to full brightness (which may be desirable in various applications such as entertainment lighting). In some embodiments, the steady-state power (even when the lamp is not dimmed) may also use pulsing according to a duty cycle. The peak power of the amplifier 124 can be higher than the desired steady-state operating conditions and pulsing can be used to reduce the average power to the desired level while maintaining amplifier efficiency.

In some examples, a power level to the amplifier may be used that causes the amplifier to operate at 70% to 95% efficiency or any range subsumed therein. In particular, in example embodiments, the high gain stage(s) of the amplifier 124, such as the output stage 124d, may operate at 70% to 95% efficiency or any range subsumed therein. In example embodiments, the efficiency of the amplifier 124 (or high gain stage(s)) may be in the range of from about 70% to 100% of its peak efficiency or any range subsumed therein. In some examples, the power level may cause the amplifier 124 (and/or one or more high gain stage(s)) to operate at or near saturation. In some embodiments, the power level may be in the range of from about 70% to 100%, or more, of the power level required for saturation or any range subsumed therein.

By pulsing the power at these levels, desired efficiency and operating conditions of the amplifier 124 may be maintained during dimming (or steady-state operation in some embodiments) even when the efficiency and operating conditions would not be obtained if the power level was dropped to the same average power without pulsing. By keeping the amplifier 124 (or high gain stage(s) of the amplifier) in an efficient range and pulsing the power, the overall efficiency of the lamp can be improved in some embodiments.

The operation of an example lamp and the lamp drive circuit 106 during startup will now be described with reference to FIGS. 4A to 4E and with continuing reference to FIGS. 1A and 3A. FIGS. 4A to 4E are flow charts of a method for starting an electrodeless plasma lamp according to an example embodiment. Various start and threshold values used by the microprocessor 132 to control the lamp may be determined empirically in advance when the lamp is tested and configured. These values may be programmed into the microprocessor 132 and memory ahead of time and used as described below.

The examples described below and in FIGS. 4A to 4E (as well as FIG. 5, discussed below) use reflected or reverse power to determine lamp operating conditions. In alternative embodiments, ripple current or light detected from a photo-detector may be used or other detected conditions in the lamp or the lamp drive circuit 106 may be used (for example, forward power or net power or other conditions). In some embodiments, a combination of detectors may be used (for example, different threshold values during startup or run mode may be determined using different techniques such as reflected power, ripple current, or level of light detected).

Figure 4A:
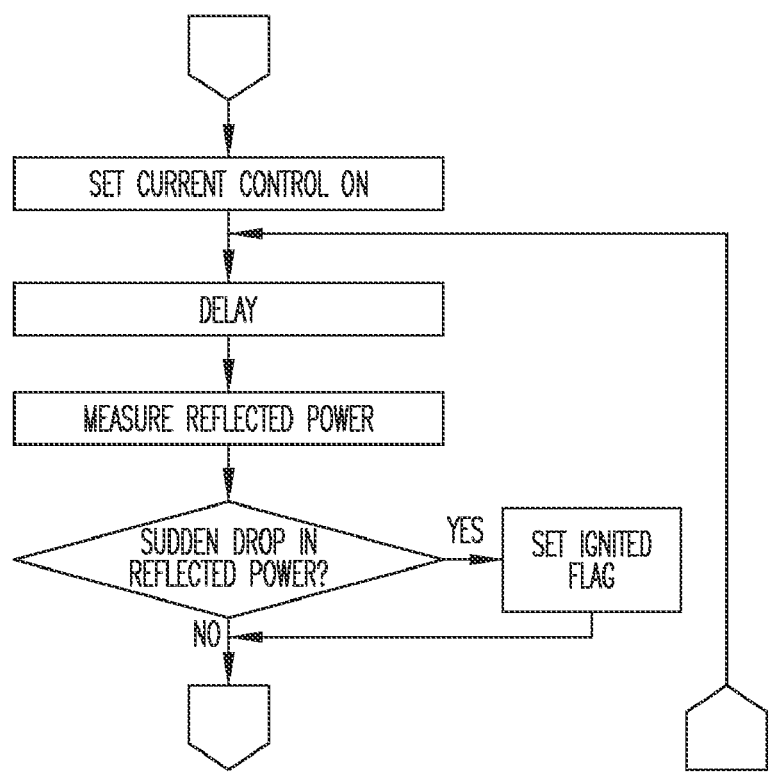
FIGS. 4A to 4E are flow charts of a method for starting an electrodeless plasma lamp according to an example embodiment.

In the example shown in FIGS. 4A to 4E, for ignition mode, the microprocessor 132 sets internal flags in memory (not shown) to indicate that the lamp has not started. It then set the control voltage on the VCO 130 to the desired level for startup and turns the VCO on. As indicated in FIG. 4A, the microprocessor 132 then sets "current control" to on, which prevents the lamp drive circuit 106 from exceeding a maximum current (as determined by the current sensor 136). The microprocessor 132 then measures the reflected power and determines whether the value has dropped below a threshold, indicating ignition of the lamp. Upon ignition, the microprocessor 132 sets an ignited flag in memory to indicate that the fill in the bulb 104 has ignited.

Figure 4B:
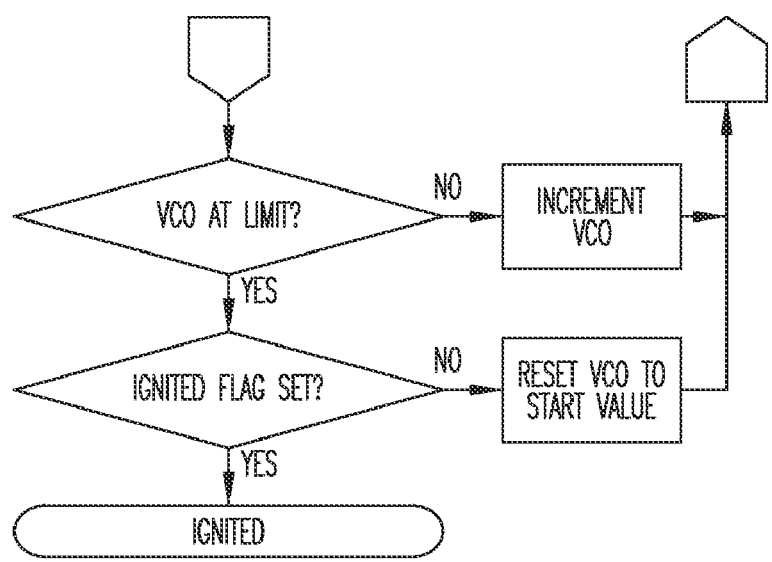

As indicated by reference to FIG. 4B, the microprocessor 132 then increments the VCO 130 over a range of frequencies. In one example embodiment, the VCO 130 is incremented over a range of about 50 MHz in steps of about 60 kHz (by adjusting the control voltage on the VCO 130 in steps of about 3 mV). In other embodiments, the frequency sweep may cover a range of about 10 MHz to 100 MHz or any range subsumed therein in steps of 10 kHz to 1 MHz or any range subsumed therein. These are examples only and other embodiments may use other ranges. This continues until the VCO 130 has stepped through the frequency range and the lamp has ignited (as indicated by the ignited flag).

Figure 4C:
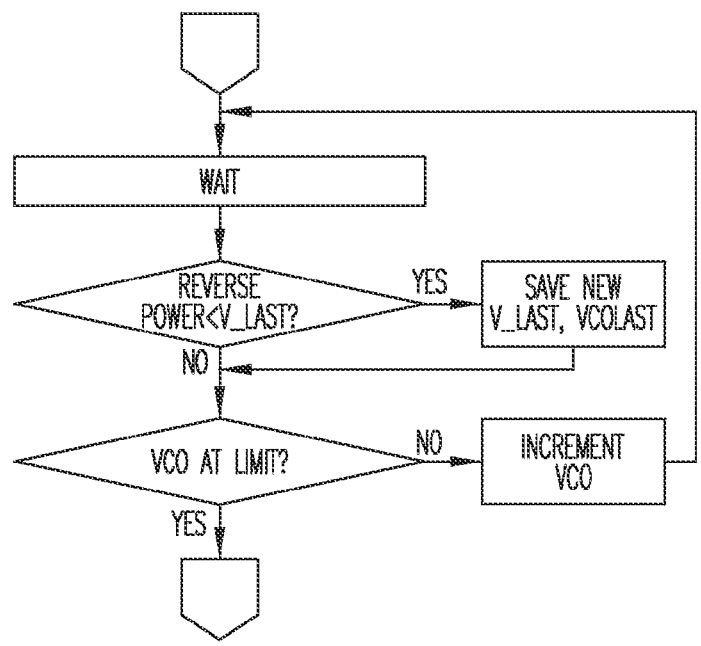

Referring now to FIG. 4C, the lamp then enters the warm up stage. The microprocessor 132 then sets adjusts the current in the lamp drive circuit 106 (as sensed by the current sensor 136) to a predetermined level desired for warm up. The VCO 130 is set to its start value and stored by the microprocessor 132 in memory as VCOlast. The microprocessor 132 also reads the reverse power and saves the value as V_last.

The microprocessor 132 then increments the VCO 130 over a range of frequencies (in a similar manner to that described, above, with reference to FIG. 4B). The microprocessor 132 reads the reverse power after each increment. If the reading is lower than the prior value (V_last), the microprocessor 132 saves the value read by the power detector as V_last and saves the level of the VCO 130 as VCOlast. This continues until the VCO 130 has been incremented through the full range of warm up frequencies and reaches the upper limit of the range.

Figure 4D:
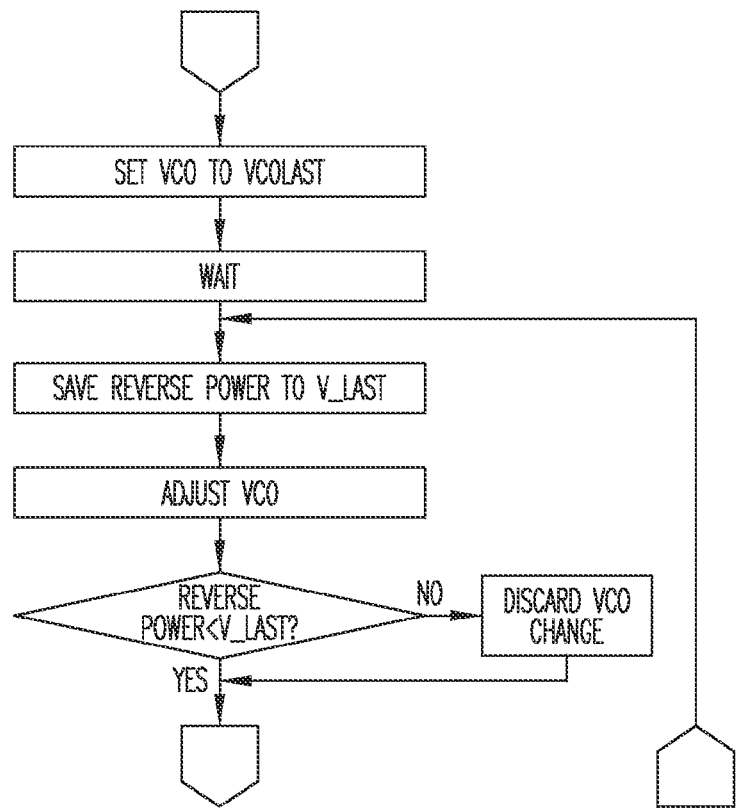
Figure 4E:
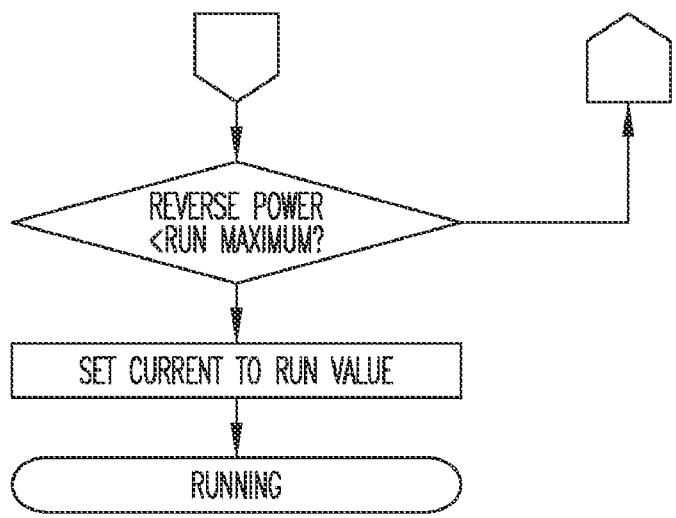

With reference to FIG. 4D, the VCO 130 is then set to VCOlast and the reverse power is read and saved as V_last. The microprocessor 132 then adjusts the VCO in small increments to see if it will decrease reflected power. This continues until the reverse power drops below the threshold required for run mode as indicated with reference to FIG. 4E. The microprocessor 132 then adjusts the current to the level desired for run mode.

Figure 5:
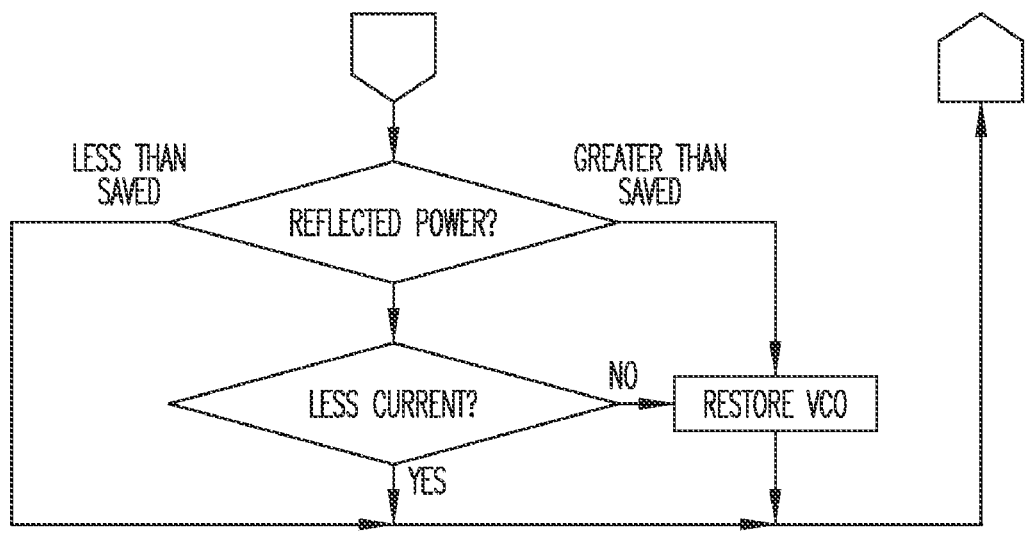
FIG. 5 is a flow chart of a method used for run mode operation of an electrodeless plasma lamp according to an example embodiment.

The operation of the lamp in run mode will now be described in reference to FIG. 5 with concurrent reference to FIGS. 1A and 3A. FIG. 5 is a flow chart of a method used for run mode operation of an electrodeless plasma lamp according to an example embodiment. During run mode, the microprocessor 132 checks several conditions to see if there is a change in the mode of the lamp. For example, the microprocessor 132 may check that the level of reflected power is below the threshold level required for the run mode (which may indicate a failure condition). The microprocessor 132 may also check for a stop command to shut off the lamp. The microprocessor 132 may also check for commands to change the brightness. The microprocessor 132 may also check if the lamp is operating in a low brightness conditions (for example, less than 20% brightness) and, in some embodiments, may not further adjust the VCO 130 to optimize based on reverse power in low brightness modes.

After the preliminary status checks, the microprocessor 132 may change the frequency of the VCO 130 in small increments for optimization. As indicated with reference to FIG. 5, the level of reflected power is a primary measure used for optimization. If reflected power increases due to the change in the VCO 130, then the change in the VCO 130 is discarded and the loop is repeated (preliminary status checks which may be followed by another change in the VCO 130 to check for optimization), except that the change in the VCO 130 will be made in the opposite direction the next time through the loop. If reflected power decreases due to the change in the VCO 130, then the VCO change is maintained and the loop is repeated (and the next VCO change will be made in the same direction since it reduced reflected power). If the reflected power is the same as the prior value, then the current level is checked. If the current level is lower than the prior level, then the change in the VCO 130 is maintained and the VCO 130 continues to be adjusted in the same direction. If the current level is not lower, then the VCO change is discarded and the VCO 130 is adjusted in the opposite direction the next time through the loop.

In some embodiments and with continuing reference to FIGS. 1A and 3A, the lamp drive circuit 106 may include a spread spectrum mode to reduce EMI. Spread spectrum is turned on by a spread spectrum controller 333. When spread spectrum is turned on, a signal to the VCO 130 is modulated to spread the power provided by the lamp drive circuit 106 over a larger bandwidth. This can reduce EMI at any one frequency and thereby help with compliance with, for example, Federal Communications Commission (FCC, a United States agency) or other regulatory agency regulations regarding EMI. In example embodiments, a degree of spectral spreading may be from 5% to 30% or any range subsumed therein. In example embodiments, modulation of the VCO 130 can be provided at a level that is effective in reducing EMI without any significant impact on the plasma in the bulb 104.

In some example embodiments, the amplifier 124 may also be operated at different bias conditions during different modes of operation for the lamp. The bias condition of the amplifier 124 has a large impact on DC-RF efficiency. For example, an amplifier biased to operate in Class C mode is more efficient than an amplifier biased to operate in Class B mode, which in turn is more efficient than an amplifier biased to operate in Class A/B mode. However, an amplifier biased to operate in Class A/B mode has a better dynamic range than an amplifier biased to operate in Class B mode, which in turn has better dynamic range than an amplifier biased to operate in Class C mode.

In one example, when the lamp is first turned on, the amplifier 124 is biased in a Class A/B mode. The Class A/B mode provides better dynamic range and more gain to allow the amplifier 124 to ignite the plasma and to follow the resonant frequency of the lamp as it adjusts during startup. Once the plasma reaches its steady-state operating condition (run mode), the bias on the amplifier 124 is removed which puts the amplifier 124 into Class C mode. This provides improved efficiency. However, the dynamic range in Class C mode may not be sufficient when the brightness of the lamp is modulated below a certain level (e.g., less than 70% of full brightness). When the brightness is lowered below the threshold, the amplifier 124 may be changed back to Class A/B mode. Alternatively, Class B mode may be used in some embodiments.

In some example embodiments, an idle mode can be used to allow for a zero hot re-strike time of the discharge source. When an off state command is received by the microprocessor 132, the microprocessor 132 can adjust the gain of the attenuator 137 and/or the amplifier 124 to achieve a low power idle state of the rare gas fill of the bulb (for example, the bulb described with reference to FIG. 2B). This idle state maintains an ionization of the rare gas fill such that a subsequent bulb turn-on command can bring the source back on to full brightness without extended cooling time of the lamp. Such cool down time is normally required for metal halide discharge sources that contain electrodes. Since critical electrode operating temperatures are not a limitation with regard to operating power levels, electrodeless plasma sources as described herein can operate at greatly reduced power levels, such as a few percent of nominal power. Electrode based lamps cannot operate at such low power idle levels described herein without accelerated sputtering of electrode material and early bulb failure.

Figure 2C:
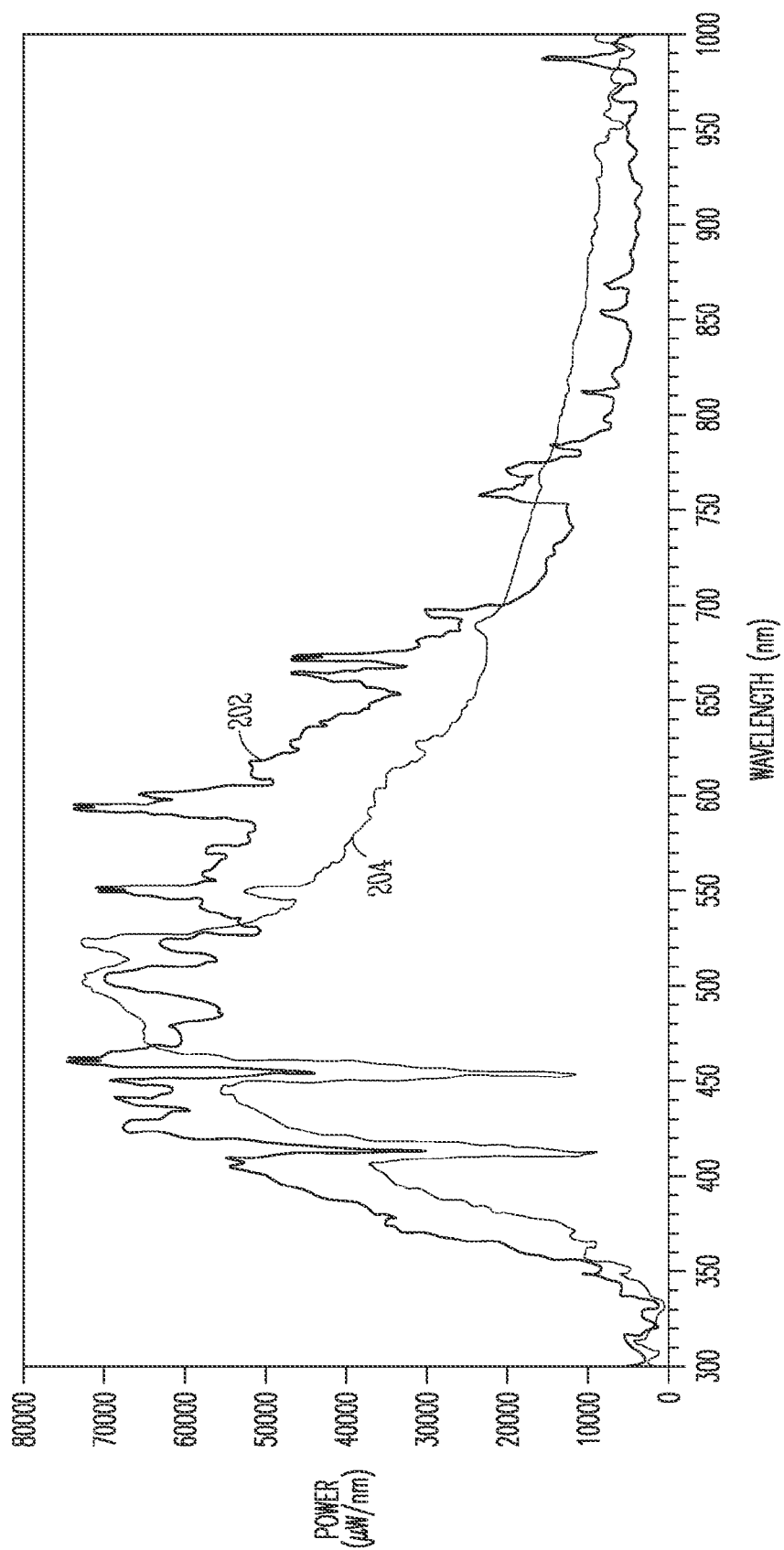
FIG. 2C illustrates the spectrum produced by a fill according to an example embodiment.

In one aspect, the bulb is situated inside a resonant RF waveguide cavity as describe with reference to FIG. 1A with an RF drive probe feed. The microwave energy causes an ionization avalanche in the rare gas fill of the bulb 104, resulting in a sustained plasma discharge. Further ohmic heating of the bulb fill increases the vapor pressure of the additives, giving rise to atomic and molecular energy transitions. Spectral discharge radiation such as that described with reference to FIG. 2C results, which depends on the additive constituents and molar ratios. The bulb 104 is brought to full power through the microprocessor 132 control of the lamp drive circuit 106.

In some examples, the bulb 104 starts at sub-atmospheric pressure and achieves many atmospheres of pressure during this warm-up phase. Similarly, after the bulb 104 is turned off, the vapor pressure returns to a significantly lower level. The rate of vapor pressure decrease depends on the external cooling environment, but is typical several minutes before the lamp can be reignited. Particularly detrimental to re-strike when the bulb (e.g., an arc tube) is still warm is the lingering vapor pressure of halogen (bromine, iodine, etc.) in metal halide lamps while they are still cooling down

resulting in the formation of a stable negative ion with a binding energy of 3.2 eV (e.g., see John Waymouth, *Electric Discharge Lamps*, MIT Press (1971), p. 254). In the above description, Br (bromine) could be substituted for I (iodine). The net effect is fewer free electrons to participate in the Townsend avalanche process, requiring higher breakdown voltages until the halogen condenses to the walls of the arc tube. In the case of the present inventive subject matter, when the power supply to the lamp is turned off by the operator, the power unit goes into a keep-alive idle state at a few percent of maximum power. Since the discharge remains in a fully ionized state even at very low power, re-ionization of the discharge is not required to bring the lamp back to full or intermediate power levels. For electroded lamps, on the other hand, the unit would extinguish at very low power and a high voltage ignition pulse (20 kV to 30 kV) must be applied since the halogen pressure (and resulting electrode attachment) remains high. In any case, an electroded lamp cannot be simmered at less than approximately 50% of rated power without cooling the electrode tips to the point that they will not operate thermionically, and will sputter tungsten to the walls causing significant wall darkening and electrode degradation. For at least the reasons noted above, the hot re-strike problem of standard metal halide lamps can be alleviated by maintaining this low power idle state.

The idle state described by the present inventive subject matter described herein is for the time necessary for the bulb temperature and subsequent halogen vapor pressure to decrease to levels wherein the bulb could then be extinguished and re-ignited immediately. The power level at idle can be adjusted and timed appropriately to ensure sufficient cooling of the bulb halogen chemistry to allow for the zero hot re-strike time.

FIGS. 6A to 6D show example embodiments using a tuning hole in the lamp body for impedance matching and/or frequency tuning. In some example embodiments, one or more tuning holes may be formed in the lamp body to improve matching of the impedance of the probe to the lamp body and plasma during the run state and thereby reduce reflected power from the lamp body and/or to adjust or tune the resonant frequency of the lamp body. In some examples, the holes may be metalized or coated with a conductive material (or a conductive material may be inserted a desired length into the tuning hole). In other embodiments, the tuning hole is not metalized and is uncoated. The examples shown with reference to FIGS. 6A to 6D show tuning holes in a lamp body that is not as tall as the lamp body 102 of FIG. 1A. In example embodiments, these lamps may operate in a resonant cavity mode rather than a quarter wave coaxial resonator mode. However, similar tuning holes may be used in the embodiment described with reference to FIG. 1A or in other example embodiments that operate in a quarter-wave coaxial resonator mode.

Figure 6A:
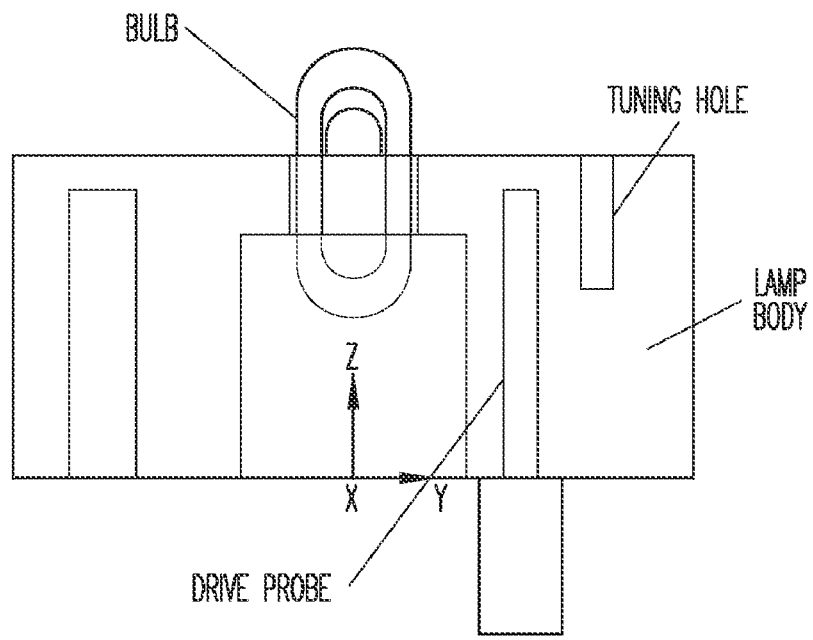
FIGS. 6A to 6D show example embodiments using a tuning hole in the lamp body for impedance matching and/or frequency tuning.
Figure 6B:
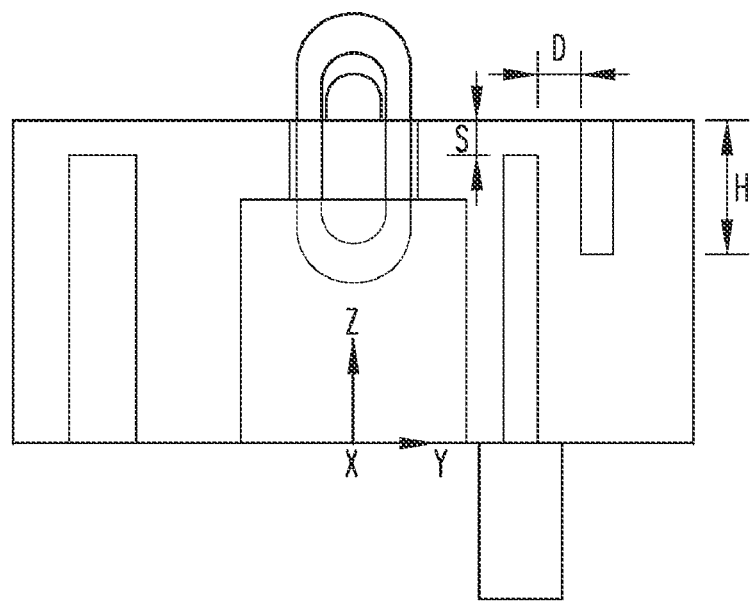
Figure 6C:
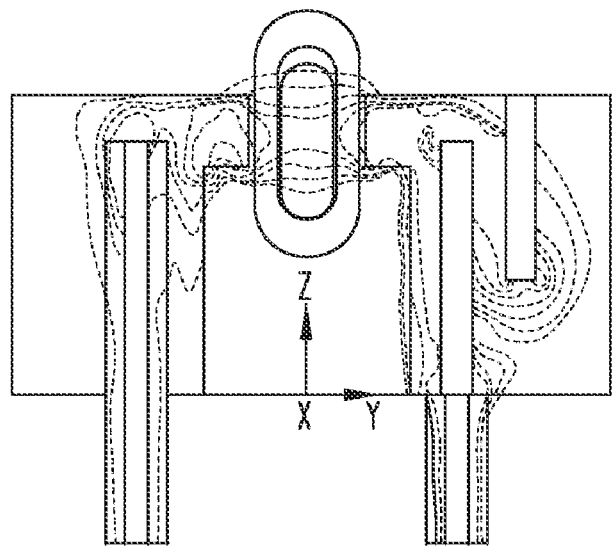

The following is a description of how tuning holes may be used for impedance matching with reference to FIGS. 6A to 6C. In some example embodiments, a depth of the drive probe determines its capacitive coupling to the lamp body, which dictates the power transfer to the bulb during the run state. There may be an optimum depth of the drive probes that provides maximum power coupling to the bulb. In some embodiments, the depth of the drive probe may be constrained by failure modes like probe arcing to the top metallization of the lamp body. To achieve coupling without arcing in example embodiments, a tuning hole may be used for matching the impedance of the probe to the lamp body and plasma during the run state. The dimensions S (distance from top metalized surface of lamp body), D (distance between drive probe and tuning hole), and H (height/depth of tuning hole) of FIG. 6B can be chosen such that the reflected power from the lamp body is reduced relative to the amount of reflected power without the tuning hole and without arcing from the probe to the top metalized surface. In this example, the tuning hole may be metalized. The tuning hole provides an additional path for capacitive coupling of the probe to the top surface of the puck. In some embodiments, this allows a wider range of probe depths to be evaluated for improving lumens per watt (LPW) coupling efficiency without affecting the impedance match. In example embodiments, the tuning hole also avoids probe arcing.

Referring now to FIG. 6C, a simulation shows strong E-fields between the probe and the tuning hole. In one example, a lamp has a starting frequency of 937 MHz, a net power of 180 W, and a tuning hole with dimensions S is 3 mm, H is 10 mm, and D is 3 mm. In this example, reflected power is about 15 W. In another example, H is 13 mm and the reflected power drops to about 0.3 W (and the starting frequency is about 925 MHz).

Figure 6D:
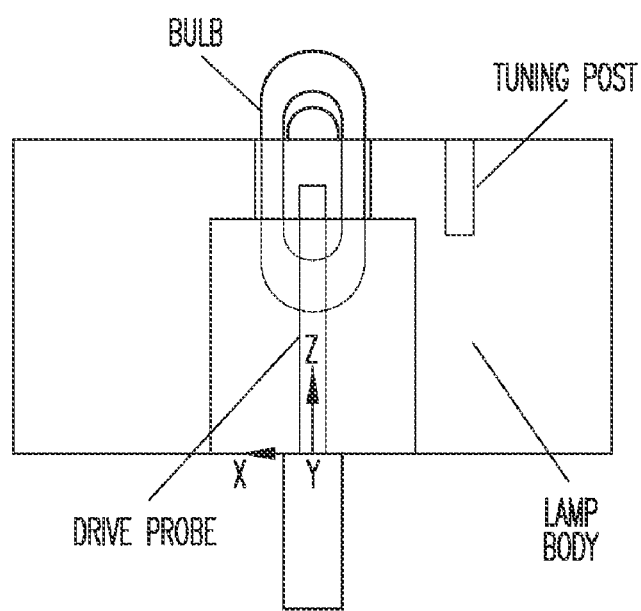

The following is a description of how tuning holes may be used for frequency tuning with reference to FIG. 6D. Since the thin region of the lamp body near the bulb (shown at the thin region 112 of FIG. 1A) is a high field or equivalently a highly capacitive region, modifications or addition of metallic posts close to this region can alter the fields and hence the frequency of the puck in example embodiments. In some embodiments, this may be used to tune the puck into the frequency range of interest. In some example embodiments, metalizing the tuning post reduces the frequency and leaving it unmetalized and moving it closer to or in the thin region 112 increases the frequency. In one example, a lamp without a tuning hole has a starting frequency of about 944 MHz. When a metalized tuning hole with an H dimension of about 5 mm is included (referring again to FIG. 6D), the starting frequency is about 924 MHz.

Additional aspects of electrodeless plasma lamps according to example embodiments will now be described with reference again to FIGS. 1A and 1B. In example embodiments, the lamp body 102 has a relative permittivity greater than air. The frequency for resonance generally scales inversely to the square root of the relative permittivity (also referred to as the dielectric constant) of the lamp body 102. The shape and dimensions of the lamp body 102 also affect the resonant frequency. In an example embodiment, the lamp body 102 is formed from solid alumina having a relative permittivity of about 9.2. In some embodiments, the dielectric material may have a relative permittivity in the range of from 2 to 100, or any range subsumed therein, or an even higher relative permittivity. In some embodiments, the lamp body 102 may include more than one such dielectric material resulting in an effective relative permittivity for the lamp body 102 within any of the ranges described above. The lamp body 102 may be rectangular, cylindrical, or other shape as described herein.

In example embodiments, the outer surfaces of the lamp body 102 may be coated with an electrically conductive coating, such as electroplating or a silver paint or other metallic paint that may be fired onto the outer surface of the lamp body. The electrically conductive material may be grounded and forms both the outer conductor and the inner conductor for the coaxial resonant structure as described herein. The electrically conductive coating also helps contain the radio frequency power in the lamp body 102. Regions of the lamp body 102 may remain uncoated to allow power to be transferred to or from the lamp body 102. For example, the bulb 104 may be positioned adjacent to an uncoated portion of the lamp body 102 to receive radio frequency power from the lamp body 102. In addition, there may be a small gap in the coating where the drive probe 120 is inserted into the lamp body 102. A high breakdown voltage material, such as a layer of glass frit, may be coated on the outside of the electrically conductive coating to prevent arcing, including the edges of the conductive material that are spaced a few millimeters from one another by the uncoated surface 114 of the lamp body 102.

In the example embodiment described with reference to FIG. 1A, the opening 110 extends through the thin region 112 of the lamp body 102. The uncoated surface 114 of the lamp body 102 in the opening 110 are uncoated and at least a portion of the bulb 104 may be positioned in the opening 110 to receive power from the lamp body 102. In example embodiments, the thickness H2 of the thin region 112 may range from 1 mm to 15 mm, or any range subsumed therein, and may be less than an outside length and/or an interior length of the bulb 104. One or both ends of the bulb 104 may protrude from the opening 110 and extend beyond the electrically conductive coating on the outer surface of the lamp body 102. This helps avoid damage to the ends of the bulb 104 from the high intensity plasma formed adjacent to the region where power is coupled from the lamp body 102. In other embodiments, all or a portion of the bulb 104 may be positioned in a cavity extending from an opening on the outer surface of the lamp body 102 and terminating in the lamp body 102. In other embodiments, the bulb 104 may be positioned adjacent to an uncoated outer surface of the lamp body 102 or in a shallow recess formed on the outer surface of the lamp body 102 (e.g., the waveguide body).

A layer of material 116 may be placed between the bulb 104 and the dielectric material of the lamp body 102. In example embodiments, the layer of the material 116 may have a lower thermal conductivity than the lamp body 102 and may be used to optimize a thermal conductivity between the bulb 104 and the lamp body 102. In an example embodiment, the material 116 may have a thermal conductivity in the range of about 0.5 to 10 watts/meter-Kelvin (W/mK) or any range subsumed therein. For example, alumina powder with a 55% packing density (i.e., 45% fractional porosity) and thermal conductivity in a range of about 1 to 2 watts/meter-Kelvin (W/mK) may be used. In some embodiments, a centrifuge may be used to pack the alumina powder with high density. In an example embodiment, a layer of alumina powder is used with a thickness D5 (see FIG. 1A) within a range of about ⅛ mm to 1 mm or any range subsumed therein. Alternatively, a thin layer of a ceramic-based adhesive or an admixture of such adhesives may be used. Depending on the formulation, a wide range of thermal conductivities is available. In practice, once a layer composition is selected having a thermal conductivity close to the desired value, fine-tuning may be accomplished by altering the layer thickness. Some example embodiments may not include a separate layer of material around the bulb 104 and may provide a direct conductive path to the lamp body 102. Alternatively, the bulb 104 may be separated from the lamp body 102 by an air-gap (or other gas-filled gap) or vacuum gap.

In some example embodiments, alumina powder or other material may also be packed into the recess 118 formed below the bulb 104. In the example described with reference to FIG. 1A, the alumina powder in the recess 118 is outside the boundaries of the waveguide formed by the electrically conductive material on the surfaces of the lamp body 102. The material in the recess 118 provides structural support, reflects light from the bulb 104 and provides thermal conduction. One or more heat sinks (not shown in FIG. 1A) may also be used around the sides and/or along the bottom surface of the lamp body 102 to manage temperature. Thermal modeling may be used to help select a lamp configuration providing a high peak plasma temperature resulting in high brightness, while remaining below the working temperature of the bulb material. Example thermal modeling software includes the TAS software package available commercially from Harvard Thermal, Inc. of Harvard, Mass.

In an example embodiment, the drive probe 120 may be a brass rod glued into the lamp body 102 using silver paint. In other embodiments, a sheath or jacket (not shown) of ceramic or other material may be used around the drive probe 120, which may change the coupling to the lamp body 102. In an example embodiment, a printed circuit board (pcb, not shown) may be positioned transverse to the lamp body 102 for the lamp drive circuit 106 or other electronic circuits. The drive probe 120 may be soldered to the pcb and extend off the edge of the pcb into the lamp body 102 (e.g., parallel to the pcb and orthogonal to the lamp body 102). In other embodiments, the drive probe 120 may be orthogonal to the pcb or may be connected to the lamp drive circuit 106 through SMA connectors or other connectors. In an alternative embodiment, the drive probe 120 may be provided by a pcb trace and portions of the pcb board containing the trace may extend into the lamp body 102. Other radio frequency feeds (not shown) may be used in other embodiments, such as microstrip lines or fin line antennas. In other embodiments, the probe or probes may be connected to the lamp drive circuit 106 by a coaxial cable or other transmission line.

In an example embodiment, the drive probe 120 is positioned closer to the bulb 104 in the center of the lamp body 102 than the electrically conductive material of the outer coating 108o around the outer circumference of the lamp body 102. This positioning of the drive prove 120 can be used to improve coupling of power to the plasma in the bulb 104.

High frequency simulation software may be used to help select the materials and shape of the lamp body 102 and electrically conductive coating or coatings to achieve desired resonant frequencies and field intensity distribution in the lamp body 102. Simulations may be performed using software tools such as HFSS, available from Ansoft, Inc. of Pittsburgh, Pa.; Multiphysics, available from COMSOL, Inc. of Burlington, Mass.; or Microwave Studio available from Computer Simulation Technology AG to determine a desired shape of the lamp body 102, resonant frequencies, and field intensity distribution. The desired properties may then be fine-tuned empirically or experimentally.

While a variety of materials, shapes, and frequencies may be used, in some example embodiments, the aspect ratio of the lamp (length H1 divided by width or diameter D1) is about one. In some embodiments, the length H1 is more than the width D1 or more than 75% to 100% of the width D1 or any range subsumed therein. In some examples, the lamp is designed to resonate at a frequency of less than about 500 MHz or less than 200 MHz or lower in some examples. In some embodiments, the lamp is configured to resonate in a fundamental mode at a frequency of between about 50 to 500 MHz or any range subsumed therein. In example embodiments operating at these frequencies, the length H1 is more than 40 mm. In some examples, the length H1 is more than three times the length of the bulb. In some examples, the length of the recess (and length of the inner conductor) is more than 30 mm or 35 mm or 40 mm or 45 mm (and in some of these example embodiments, the probe may have a length more than 30 mm or 35 mm or 40 mm or 45 mm and be substantially parallel to the length of the recess and the bulb). In some examples, the length of the inner conductor formed by the recess (H3) is more than three times the diameter of recess D2 and more than three times the length of the bulb. In some examples, the length H1 is greater than the diameter D1 (or width of the lamp body for rectangular or other shapes). The outer conductive coating along length H1 and conductive coating along the recess form inner and outer coaxial conductive elements in some embodiments. This provides a coaxial capacitance substantially orthogonal to the length of the bulb. In contrast, the thin region 112 (see FIG. 1A) provides a shelf that provides a capacitance substantially parallel to the length of the bulb 104, which provides an electric field along the length of the bulb 104. The thin region 112 shapes the electric field and changes its orientation relative to the electric field formed between the inner and outer electrodes along the length of the lamp body 102. In some embodiments, the long coaxial capacitive region between the surface along H1 and the surface along the recess 118 is configured to provide approximately a quarter-wave resonant structure. The additional capacitance provided in the thin region 112 may also impact the resonant frequency relative to a coaxial structure without this region.

In one embodiment designed to operate at about 450 MHz, the length H1 (which is the length of outer conductor along the sides of the lamp) is about 45.5 mm and the diameter D1 is about 50 mm The distance H1 (which is the length of the inner conductor in recess 118) is about 41 mm. In this example, the distance D2 is about 14 mm and D3 is about 2.5 mm (the diameter of the hole for the bulb 104 is about 9 mm in diameter in this example). The thin region 112 forms a shelf over the recess 118. The distance H2 is about 5 mm (more generally 2 mm to 10 mm or any range subsumed therein). This results in higher capacitance in this region of the lamp body 102 and higher electric field intensities. In this example, the drive probe 120 has a length of about 41.5 mm In this example, the lamp body 102 is alumina and has a relative permittivity of about 9.

In some embodiments, the relative permittivity is in the range of about 9 to 15 or any range subsumed therein, the frequency of the RF power is less than about 500 MHz, and the volume of the lamp body 102 is in the range of about 10 $cm^3$ to 75 $cm^3$ or any range subsumed therein. In some of these examples, the RF power resonates in the resonant structure in a quarter-wave mode and the outer dimensions of the lamp body 102 are all less than one half-wavelength of the RF power in the resonant structure.

The above dimensions, shape, materials and operating parameters are examples only and other embodiments may use different dimensions, shape, materials and operating parameters.

What is claimed is:

1. An electrodeless plasma lamp comprising:
   a resonant structure having a quarter wave resonant mode, the resonant structure including:
      an inner conductor;
      an outer conductor; and
      a solid dielectric material between the inner conductor and the outer conductor; a source of radio frequency (RF) power configured to provide RF power to the resonant structure at about the resonant frequency for the quarter wave resonant mode;
   a bulb containing a fill that forms a plasma when the RF power is coupled to the fill, the bulb positioned proximate to a non-conductive surface of the solid dielectric material, wherein at least one end of the bulb protrudes outside of the resonant structure; and
   an electrically-conductive shield to reduce electromagnetic interference from the lamp, the shield being positioned external to the resonant structure and proximate to the bulb, a surface of the shield being distal to the bulb.

2. The electrodeless plasma lamp of claim 1, wherein at least a portion of the outer conductor is positioned proximate a first side of the non-conductive surface proximate the bulb and at least a portion of the inner conductor is positioned proximate a second side of the non-conductive surface proximate the bulb.

3. The electrodeless plasma lamp of claim 1, wherein the resonant structure forms an open circuit between the outer conductor and the inner conductor proximate the bulb.

4. The electrodeless plasma lamp of claim 1, wherein the inner conductor and the outer conductor form a short circuit in a region of the resonant structure opposite from the end of the structure that is proximate the bulb.

5. The electrodeless plasma lamp of claim 1, wherein the bulb is elongate and a portion of the outer conductor is proximate a first end of the bulb and a portion of the inner conductor is proximate a second end of the bulb and the resonant structure is configured to form an electric field in the bulb substantially parallel to the central axis of the bulb between the first end and the second end.

6. The electrodeless plasma lamp of claim 1, wherein the bulb is elongate and both ends of the bulb protrude outside of the resonant structure, extending beyond the boundary formed by the outer conductor at a first end of the bulb and extending beyond a boundary formed by the inner conductor at a second end of the bulb.

7. An electrodeless plasma lamp, comprising:
   a resonant structure comprising a solid dielectric material having a relative permittivity greater than 2 and at least one conductive material proximate the solid dielectric material;
   a source of radio frequency (RF) power configured to provide RF power to the resonant structure at a frequency having a wavelength in free space at the relative permittivity of the dielectric material ($\lambda$);
   a bulb containing a fill that forms a plasma when the RF power is coupled to the fill;
   an electrically-conductive shield to reduce electromagnetic interference from the lamp, the shield being positioned external to the resonant structure and proximate to the bulb, a surface of the shield being distal to the bulb;
   wherein each of the dimensions across the resonant structure (including height and width) are less than $\lambda/2$; and
   wherein the RF power is provided at about a resonant frequency for the resonant structure.

8. The electrodeless plasma lamp of claim 7, wherein the volume of the dielectric material is greater than the volume of the bulb.

9. The electrodeless plasma lamp of claim 7, wherein the volume of the dielectric material is greater than five times the volume of the bulb.

10. The electrodeless plasma lamp of claim 7, wherein the volume of the dielectric material is less than 75 $cm^3$ and the frequency of the RF power is less than 500 MHz.

11. The electrodeless plasma lamp of claim 7, wherein the volume of the dielectric material is less than 50 $cm^3$ and the frequency of the RF power is less than 500 MHz.

12. An electrodeless plasma lamp, comprising:
   a bulb configured to be coupled to a source of radio frequency (RF) power, the bulb containing a fill to form a plasma when the RF power is coupled to the fill;

an electrically-conductive shield to reduce electromagnetic interference from the lamp, the shield being positioned external to the resonant structure and proximate to the bulb, a surface of the shield being distal to the bulb;

a resonant structure having a quarter wave resonant mode, the resonant structure including a lamp body comprising a dielectric material having a relative permittivity greater than 2, an inner conductor and an outer conductor; and the source of RF power configured to provide RF power to the lamp body at about a resonant frequency for the resonant structure.

* * * * *

UNITED STATES PATENT AND TRADEMARK OFFICE
CERTIFICATE OF CORRECTION

| | | |
|---|---|---|
| PATENT NO. | : 8,294,382 B2 | Page 1 of 1 |
| APPLICATION NO. | : 12/683261 | |
| DATED | : October 23, 2012 | |
| INVENTOR(S) | : DeVincentis et al. | |

It is certified that error appears in the above-identified patent and that said Letters Patent is hereby corrected as shown below:

In the Claims

In column 27, line 61, in Claim 1, after "conductor;", insert --¶--, therefor

In column 28, line 35, in Claim 7, delete "relativepermittivity and insert --relative permittivity--, therefor In column 28, line 40, in Claim 7, delete "relativepermittivity" and insert --relative permittivity--, therefor In column 28, line 45, in Claim 7, delete "thelamp" and insert --the lamp--, therefor In column 28, line 47, in Claim 7, delete "thebulb" and insert --the bulb--, therefor In column 28, line 49, in Claim 7, delete "heightand" and insert --height and--, therefor In column 28, line 66, in Claim 12, delete "thebulb" and insert --the bulb--, therefor In column 29, line 4, in Claim 12, delete "thebulb" and insert --the bulb--, therefor In column 29, line 7, in Claim 12, delete "relativepermittivity" and insert --relative permittivity--, therefor Signed and Sealed this
Eighteenth Day of November, 2014

Michelle K. Lee
*Deputy Director of the United States Patent and Trademark Office*